United States Patent [19]
Moriarty et al.

[11] Patent Number: 6,128,669
[45] Date of Patent: *Oct. 3, 2000

[54] SYSTEM HAVING A BRIDGE WITH DISTRIBUTED BURST ENGINE TO DECOUPLE INPUT/OUTPUT TASK FROM A PROCESSOR

[75] Inventors: Michael P. Moriarty, Spring; Thomas J. Bonola; Brian T. Purcell, both of Tomball, all of Tex.

[73] Assignee: Compaq Computer Corporation, Houston, Tex.

[*] Notice: This patent is subject to a terminal disclaimer.

[21] Appl. No.: 08/940,367

[22] Filed: Sep. 30, 1997

[51] Int. Cl.⁷ ..................................................... G06F 13/00
[52] U.S. Cl. ........................ 710/1; 710/3; 710/5; 710/22; 710/24; 710/26; 710/33; 710/35; 711/111; 711/112; 711/114; 709/250
[58] Field of Search ................................... 710/3, 22, 24, 710/26, 33, 35, 1, 5; 711/114, 111, 112; 709/250

[56] References Cited

U.S. PATENT DOCUMENTS

| | | | |
|---|---|---|---|
| 5,050,066 | 9/1991 | Myers et al. | 364/200 |
| 5,448,558 | 9/1995 | Gildea et al. | 370/60 |
| 5,487,146 | 1/1996 | Guttag et al. | 345/516 |
| 5,592,648 | 1/1997 | Schultz et al. | 711/114 |
| 5,613,162 | 3/1997 | Kabenjian | 710/22 |
| 5,664,223 | 9/1997 | Bender et al. | 710/842 |
| 5,687,316 | 11/1997 | Graziano et al. | 709/250 |
| 5,689,509 | 11/1997 | Gaytan et al. | 370/396 |
| 5,694,555 | 12/1997 | Morriss et al. | 710/100 |
| 5,708,779 | 1/1998 | Graziano et al. | 709/250 |
| 5,734,847 | 3/1998 | Garbus et al. | 710/128 |

FOREIGN PATENT DOCUMENTS

| | | | |
|---|---|---|---|
| 0 566 421 A1 | 10/1993 | European Pat. Off. | G06F 13/12 |
| 0676701A1 | 2/1995 | European Pat. Off. | G06F 13/00 |
| 0 752 802 A2 | 8/1997 | European Pat. Off. | H04Q 11/04 |
| WO 97/33230 | 9/1997 | WIPO | G06F 13/12 |

OTHER PUBLICATIONS

P1394 Link Layer Read Request Linked List Mechanism, IBM Technical Disclosure Bulletin, vol. 38, No. 03, Mar. 1995.

Varhol, Peter D., NT's New Architecture, "Small Kernels Hit it Big," Byte Articles, ©1994–1996, 9 pages.

Linthicum, David S., NT'New Architecture, "4.0 Isn't for Everyone," Byte Articles, ©1994–1996, 5 pages.

XP–0008722582 Queued Communication Interface, IBM® Technical Disclosure Bulletin, vol. 19, No. 1, Jun. 1976, pp. 217 through 221.

Primary Examiner—Meng-Ai T. An
Assistant Examiner—Nabil El-Hady
Attorney, Agent, or Firm—Akin, Gump, Strauss, Hauer & Feld, LLP

[57] ABSTRACT

An apparatus for decoupling input/output (I/O) from host processing through main memory. A command packet architecture and distributed burst engine for communicating data to an I/O device without using memory mapped I/O or host processor synchronization. The packet architecture includes a header having fields for linking packets in a list with physical and virtual addresses, thereby eliminating address translations. The distributed burst engine includes buffers and controllers for bursting the linked lists of packets between main memory and the I/O device. Doorbell registers are included for the host processor to indicate to the DBE that an event has occurred. The distributed burst engine is versatile enough to be bus independent and located virtually anywhere between main memory and the I/O device, such as a bus bridge.

22 Claims, 25 Drawing Sheets

RQSMFEND STATE TRANSITION CONDITIONS

A: IDLE * RQ_DOORBELL;
B: NEXTPKT * RQ_RDDONE * RQ_PALINK[31:5]!=0h * RQFULL;
C: NEXTPKT * RQ_RDDONE * RQ_PALINK[31:5]=0h;
D: WAIT * !RQ_FULL;

ROSMFEND OUTPUTS

```
ABORT_CYCLE = 1 if     NEXTPKT * RQLATCH_EN * CHECKVA * (RDDATA[4] + RDDATA[3]);
ABORT_CYCLE = 0 if     NEXTPKT * RQ_RDDONE;
CLR_RQ_DOORBELL = 1 if      IDLE * RQ_DOORBELL
DISABLE_LATCH = 1 if   IDLE +
                NEXTPKT * RQLATCH_EN * CHECKVA * RDDATA[4](INCLUDING redata4 + RDDATA[3])
DISABLE_LATCH = 0 if  NEXTPKT * RQ_RDDONE;
Q_RQ = 0 if   IDLE + WAIT;
Q_RQ = 1 if   NEXTPKT * RQLATCH_EN * !DISABLE_LATCH;
RQ_LEN [9:0] = 2h if IDLE;
RQ_LEN [9:0] = NEXTPKT * RQ_RDDONE * RQ_PALINK [31:5] ! = 0h;
RQ_MUX_EN = 0 if NEXTPKT * RQLATCH_EN * RQMUX_EN;
RQ_RDREQ = 1 if   [IDLE * RQ_DOORBELL] +
                  [WAIT * !RQFULL]
RQ_RDREQ = 1 if   NEXTPKT * RQ_RDDONE * RQ_PALINK[31:5]! = 0h * !RQFULL;
RQ_RDREQ = 0 if   NEXTPKT * RQLATCH_EN * RQMUX_EN;
RQ_RDREQ = 0 if   NEXTPKT * RQLATCH_EN * RQMUX_EN;
RQ_READADDR_B[31:5] < = RQ_REG [31:5] if    IDLE;
RQ_READADDR_B[31:5] < = RQ_READADDR_B [31:0] + 4h if    NEXTPKT * INCRADD;
RQ_READADDR_B[31:5] < = RQ_PALINK [31:5] if     NEXTPKT * RQ_RDDONE * RQ_PALINK[31:5]!=0h;
RQ_READADDR_B[31:5] = RQ_PALINK[31:5] if     NEXTPKT * RQ_RDDONE;
RQ_REG[31:5] < = RQREGDAT [31:5] if IDLE * RQREGWR;
RQ_REG[31:5] < = RQ_PALINK [31:5] if WAIT * !RQFULL;
RQ_REG[31:5] = RQ_PALINK[31:5] if    NEXTPKT * RQ_RDDONE * RQ_PALINK[31:5]! = 0h * !RQFULL;
RQPALINK[31:5] < = RDDDRDDAT[31:5] if   NEXTPKT * RQLATCH_EN * RQMUX_EN;
```

FIG. 8D

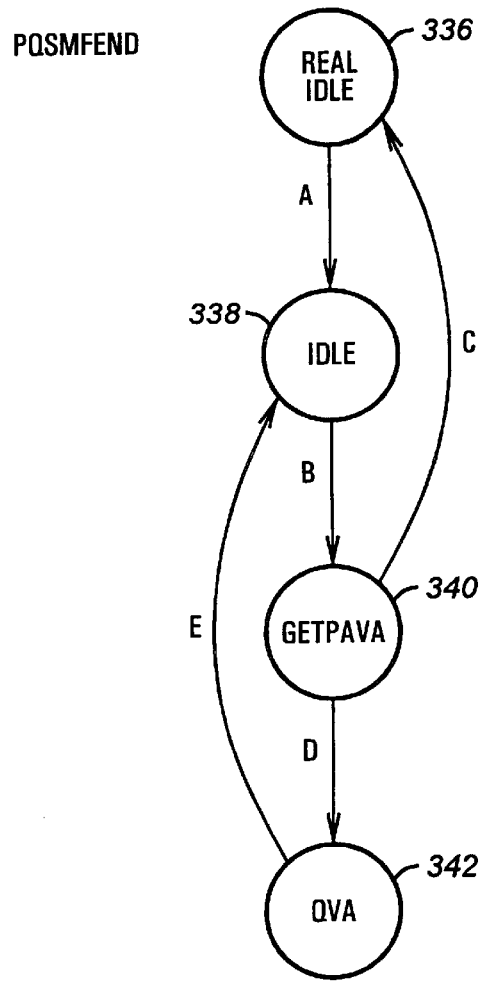

FIG. 8E

PQSMFEND STATE TRANSITION CONDITIONS

A: REALIDLE * PQ_DOORBELL;
B: don't care;
C: GETPAVA * VA_LATCHEN * PQ_PALINK[31:5] - 0h;
D: GETPAVA * VA_LATCHEN * !PQ_PALINK[31:5] - 0h;
E: don't care;

FIG. 8F

PQSMFEND OUTPUTS

PQ_REG[31:5] <- PQ_PALINK[31:5] if GETPAVA * VA_LATCHEN * !(PQ_PALINK[31:5]-0h);
PQ_PALINK[31:5] <- RDDATA[31:5 if GETPAVA * VA_LATCHEN * !(PQ_PALINK[31:5]-0h);
Q_PQ <- 0 if    REALIDLE + IDLE + GETPAVA;
Q_PQ <- 1 if    GETPAVA * VA_LATCHEN * !(PQ_PALINK[31:5] - 0h);
VALINK <- 1 if  GETPAVA * VA_LATCHEN * !(PQ_PALINK[31:5] - 0h);

FIG. 8G

ROSMBEND STATE TRANSITION CONDITIONS

A: IDLE * ! RO_ROEMPTY;

B: GETLENGTH * ! ROEMPTY;

C: GETPALINK * ! ROEMPTY;

D: GETVA * (RO_BFR[4] + (RO_BFR[3] * LENGTH[9:0] – 0h));

E: GETVA * ! * LENGTH [9:0] – 0h; (RO_BFR[4] + (RO_BFR[3] * LENGTH[9:0] – 0h));

F: GETVA * (RO_BFR[4] + (RO_BFR[3] * LENGTH[9:0] – 0h));

G: NEXTDWRD * DEVICEDORDY * LENGTH[9:0]- 0h;

H: DIRECTACC * DAC_DOORBELL * ! CLR_DAC_DOORBELL;

I: DONE * RO_VALINK[2:1] – 1h;

J: [DONE * RO_VALINK[2:1] – 2h +;

J: [DONE * RO_VALINK[2:1] – 3h;

K: [WRITE * !CQFULL * !CQBUSY * RO_VALINK[2:1]–DBE_PKT_SUBMIT_A * AGAIN * (RO_VALINK[4] + !RO_VALINK[3])];
[WRITE * !CQFULL * !CQBUSY * RO_VALINK[2:1]–DBE_PKT_SUBMIT_I * AGAIN * !RO_VALINK[4] * !RO_VALINK[3];
[WRITE * !CQFULL * !CQBUSY * RO_VALINK[2:1]–DBE_PKT_SUBMIT_A * AGAIN !(RO_VALINK[4] + !RO_VALINK[3])] +

L: [WRITE * !CQFULL * !CQBUSY * RO_VALINK[2:1]–DBE_PKT_SUBMIT_P * AGAIN * !(RO_VALINK[4] +!RO_VALINK[3]);
[WRITE * !CQFULL * !CQBUSY * RO_VALINK[2:1]–DBE_PKT_SUBMIT_P * AGAIN * (RO_VALINK[4] +!RO_VALINK[3]) +

M: [WRITE * !CQFULL * !CQBUSY * RO_VALINK[2:1]–DBE_PKT_SUBMIT_I * AGAIN * RO_VALINK[4];

N: WAIT * PROCESS_DONE * RO_VALINK[2:1]–DBE_PKT_SUBMIT_A;

O: WAIT * PROCESS_DONE * !RO_VALINK[2:1]–DBE_PKT_SUBMIT_A;

FIG. 9C

ROSMBEND OUTPUTS

CLR_DAC_DOORBELL <-- 0 if    IDLE + DIRECTACC;
CLR_DAC_DOORBELL <-- 1 if    [WRITE * !CQFULL & !CQBUSY * RQ_VALINK[2:1]-DBE_PKT_SUBMIT_A * AGAIN * !(RQ_VALINK[4] +
                             !RQ_VALINK[3])] +
                             [WRITE * !CQFULL & !CQBUSY * RQ_VALINK[2:1]-DBE_PKT_SUBMIT_P * AGAIN * !(RQ_VALINK[4] +
                             !RQ_VALINK[3])] +
                             WRITE * !CQFULL & !CQBUSY * RQ_VALINK[2:1]-DBE_PKT_SUBMIT_I * AGAIN * !RQ_VALINK[4] *
                             RQ_VALINK[3];

DQ_RQ <-- 1 if    IDLE * !RQEMPTY +
                  GETLENGTH * !RQEMPTY +
                  GETPALINK * !RQEMPTY;
otherwise DQ_RQ <-- 0;
DQRDY <-- 1 if    GETVA * !((RQ_BFR[4] + (RQ_BFR[3] * LENGTH[9:0]) * !LENGTH[9:0]-0h;
DQRDY <-- 0 if    NEXTDWORD * DEVICEDQRDY * LENGTH[9:0]-1h;
RQ_CQ <-- 1 if    WRITE * !CQFULL * !CQBUSY;
RQ_CQ <-- 0 if    IDLE + DIRECTACC + WAIT;

FIG. 9D

PQSMFEND
*310*

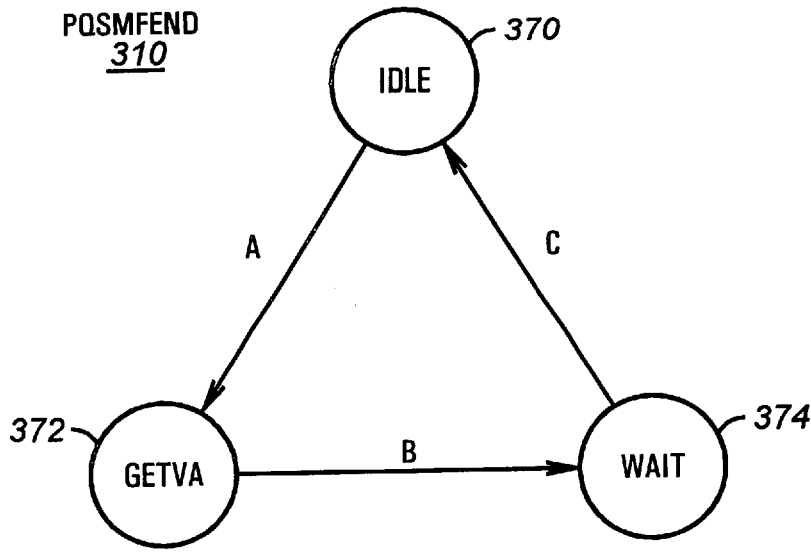

FIG. 9E

PQSMBEND STATE TRANSITION CONDITIONS

A:    IDLE * CQBUSY;
B:    GETVA * !PQEMPTY;
C:    WAIT * !CQFULL * !POSTPACKETRDY;

FIG. 9F

PQSMBEND OUTPUTS

CQBUSY < -0 if    WAIT * !CQFULL * !POSTPACKETRDY;
CQBUSY < -1 if    IDLE * POSTPACKETREQ * !PQEMPTY * !MUXVA;
DQ_CQ < -1 if    [IDLE * CQBUSY] +
                 [WAIT * POSTPACKETDONE * !CQFULL * POSTPACKETRDY] +
                 [WAIT * !CQFULL * !POSTPACKETRDY];
DQ_CQ < -0 if    [IDLE * !CQBUSY] + GETVA + WAIT;
DQ_PQ < -1 if    IDLE * (MUXVA + CQBUSY);
otherwise DQ_PQ - 0;
POSTPACKETRDY < -0 if    WAIT * POSTPACKETDONE * !CQFULL * POSTPACKETRDY;
POSTPACKETRDY < -1 if    GETVA * !PQEMPTY;

FIG. 9G

CQSM STATE TRANSITION CONDITIONS

A: IDLE * CQ_DOORBELL * (CQ_HEAD[31:2] !- 0h) * CQ_VALINKACK;
B: IDLE * !(CQ_DOORBELL * (CQ_HEAD[31:2] !- 0h)) * GO * !CQ_BFR_ADR[34] * (CQ_BFR_ADR[33:32]-3h) * (CQ_HEAD[31:2]-0);
C: [IDLE * !(CQ_DOORBELL * (CQ_HEAD[31:2] !- 0h)) * GO * !CQ_BFR_ADR[34] * (CQ_BFR_ADR[33:32]-3h) * !(CQ_HEAD[31:2]-0) * CQ_VALINKACK] + [IDLE * !(CQ_DOORBELL * (CQ_HEAD[31:2] !- 0h)) * GO * !CQ_BFR_ADR[34] * (CQ_BFR_ADR[33:32]-2h) * CQ_VALINKACK];
D: ASYNCH * !GO;
E: WAIT * INTROUTB;
F: don't care;

FIG. 10E-1

CQSM OUTPUTS

CLR_CQ_DOORBELL <- 1 if    IDLE * CQ_DOORBELL * (CQ_HEAD[31:2]-0h) * CQ_VALINKACK;
CLR_CQ_DOORBELL <- 0 if    WAIT * INTROUTB;
CQ_HEAD[31:2] <- CQ_BFR_ADR[31:2] if    BFR_HEAD;
CQ_HEAD[31:2] <- 0h if    WAIT * INTROUB;

CQ_TAIL[31:2] <- CQ_BFR_ADR[31:2] if    [IDLE * !(CQ_DOORBELL * (CQ_HEAD[31:2]-0h)) * GO * !CQ_BFR_ADR[34] *
                                        (CQ_BFR_ADR[33:32] - 3h) * CQ_HEAD[31:2]-0h] +
                                        [IDLE * !(CQ_DOORBELL * (CQ_HEAD[31:2]-0h)) * GO * !CQ_BFR_ADR[34] *
                                        (CQ_BFR_ADR[33:32] - 3h) * !CQ_HEAD[31:2]-0h * CQ_VALINKACK];

CQ_VALINKREQ <- 1 if    [IDLE * CQ_DOORBELL * (CQ_HEAD[31:2]-0h)] +
                        [IDLE * !(CQ_DOORBELL * (CQ_HEAD[31:2]-0h)) * GO * !CQ_BFR_ADR[34] * (CQ_BFR_ADR[33:32] - 3h)] *
                        !(CQ_HEAD[31:2]-0h)] +
                        [IDLE * !(CQ_DOORBELL * (CQ_HEAD[31:2]-0h)) * GO * !CQ_BFR_ADR[34] * (CQ_BFR_ADR[33:32] - 2h)];

CQ_VALINKREQ <- 0 if    [IDLE * CQ_DOORBELL * (CQ_HEAD[31:2]-0h)) * CQ_VALINKACK] +
                        [IDLE * !(CQ_DOORBELL * (CQ_HEAD[31:2]-0h)) * GO * !CQ_BFR_ADR[34] *(CQ_BFR_ADR[33:32] - 3h) *
                        !CQ_HEAD[31:2]-0h * CQ_VALINKACK];

D_AGAIN <- 0 if    IDLE;
D_AGAIN <- 1 if    (ASYNCH * DEVICEDQ * !AGAIN) +
                   (WAIT * DEVICEDQ);
D_MUXDAT - 0 if    IDLE *
                   [IDLE * CQ_DOORBELL * (CQ_HEAD[31:2]!-0h * CQ_VALINKACK) *
                   IDLE * !(CQ_DOORBELL * (CQ_HEAD[31:2]) !- 0h)]

DQ_CQ <- 1 if    [IDLE * !(CQ_DOORBELL * (CQ_HEAD[31:2]-0h)) *
                 GO * !CQ_BFR_ADR[34] * (CQ_BFR_ADR[33:32] - 3h) * CQ_HEAD[31:2]-0h] +
                 [WAIT * INTROUTB];

Otherwise DQ_CQ <- 0;
DQRDY <- 0 if    IDLE * CQ_DOORBELL * (CQ_HEAD[31:2]-0h) * CQ_VALINKACK;
FQ_REQ[31:5] <- FOREQDAT[31:5] if    [IDLE * FOREQWR];
FQ_REQ[31:5] <- CQ_BFR[31:5] if    [IDLE * !(CQ_DOORBELL * (CQ_HEAD[31:2]-0h)) * GO * !CQ_BFR_ADR[34] *
                                   CQ_BFR_ADR[33:32]-2h * CQ_VALINKACK];

MUXCTL <- 0 if    [IDLE * CQ_DOORBELL * (CQ_HEAD[31:2]-0h)] * CQ_VALINKACK;
                  [IDLE * !(CQ_DOORBELL * (CQ_HEAD[31:2]-0h)) GO * !CQ_BFR_ADR[34] *(CQ_BFR_ADR[33:32] - 3h) *

```
                    !CQ_HEAD[31:2]=0h * CQ_VALINKACK] +
                    [IDLE * !(CQ_DOORBELL * (CQ_HEAD[31:2]=0h)) * GO * !CQ_BFR_ADR[34] *
                    CQ_BFR_ADR[33:32]=2h * CQ_VALINKACK];
MUXCTL <- 1 if     [ASYNCH * DEVICEDQ * !AGAIN] +
                   [WAIT * INTROUTB];
SETINTERRUPT <- 1 if   IDLE * CQ_DOORBELL * (CQ_HEAD[31:2]=0h);
SETINTERRUPT <- 0 if   WAIT * INTROUTB;
```

*FIG. 10E-2*

SYSTEM HAVING A BRIDGE WITH DISTRIBUTED BURST ENGINE TO DECOUPLE INPUT/OUTPUT TASK FROM A PROCESSOR

BACKGROUND OF THE INVENTION

1. Field of the Invention

The invention relates to a method of communicating with intelligent input/output devices and an apparatus for automatically transferring data between the input/output devices and a host.

2. Description of the Related Art

Computer systems are being developed with more powerful and advanced features with each passing moment. Many new advanced bus structures such as the PCI, or Peripheral Component Interconnect, bus have been developed to allow greater performance of the computer system. Additionally, new serial communications buses such as Universal Serial Bus and I.E.E.E. 1394 (Institute of Electrical and Electronic Engineers) a.k.a. Firewire, have been developed as the modern personal computer is becoming a much more connected and multimedia oriented system. However, each of these places higher and higher demands upon the processor to manage and move data.

Todays operating systems are true multitasking operating systems responsible for balancing multiple tasks between given time slices. As the demand on the processor increases to service the input/output operations, it becomes more difficult to properly balance the tasks so that each task is given an adequate amount of processor time. Interrupts further complicate the matter since they are very unpredicatable and usually must be serviced quickly.

In the past, attempts have been made to solve the problem of processor loading by off loading certain operations to co-processors. A math co-processor or a direct memory access controller (DMA) are popular examples. However, the math co-processor is so tightly coupled to the processor with a proprietary interface and instructions that it is not suitable for general input/output applications. The DMA is suitable to move data once it has been configured, but requires configuration for each block of data. Thus, the DMA controller cannot function independantly beyond a single block of data (unless it is configured for demand mode). Furthermore, the DMA controller functions at a hardware level. The DMA controller has no comprehension of the type of data or type of device being serviced. Thus, the processor is always involved. In the past, the DMA controller was much more efficient at moving data from one address to another, however, todays processors are so much more efficient that their read/write cycle time approaches that of the DMA controller. So the benefits of the DMA controller have diminished over time. Moreover, any gains provided by a high performance DMA controller were typically offset by the next generation processor.

Other attempts have been made to develope intelligent input/output (I₂O) processing, but these have focused on using embedded processors, such as an Intel i960RP processor. While these solutions acheive processor independence, they do so at a very high cost. Therefore, there is a need for an inexpensive solution to intelligent input/output processing.

SUMMARY OF THE INVENTION

The present invention includes a host processor, memory and one or more input/output (I/O) devices. The host processor develops and submits packets to memory for subsequent use by the I/O devices. The packets include a header portion for containing addresses and other information and a payload portion for carrying data or messages. The packets are linked together in a list to form a pool of packets. The packet header includes a physical address field, a next packet physical address field, a virtual address field and a next packet virtual address field. Thus, once a packet is read, the packet's virtual and physical address is known as well as the next packet's virtual and physical address. A first packet contains the next packet's physical and virtual address to form the linked list. Once the links are established, the packet pool can be operated on with either virtual or physical addresses without the need for further address translation. The virtual and physical address fields are in predefined locations of the header so that indexing can be used to read the required address.

To facilitate the movement of packets, there is disclosed a distributed burst engine (DBE) which couples between one or more input/output (I/O) devices and main memory. The distributed burst engine is a versatile component capable of residing either at the bus interface of a single I/O device, a bridge device or a memory controller, thereby coupling to multiple I/O devices.

The distributed burst engine architecture defines a queue scheme allowing the processor to continually queue packets to the I/O device without having the processor write the packet's physical address to a device register. Because the packets are linked together the DBE always know where to get the next packet. This enables the DBE to burst data from memory without processor intervention.

The DBE includes three data buffers or first-in-first-out memories (FIFOs) between a front end and a back end for holding packets: a request buffer, a posted buffer and a completion buffer. The front end of the DBE is generally responsible for pulling packets from memory to keep the request buffer and posted buffers filled while pushing packets to memory to keep the completion buffer empty. The back end of the DBE interacts with one or more I/O devices to present command, control, address and data information from the packets to the I/O device.

To facilitate the movement of packets on and off the linked lists, head and tail registers are maintained by the DBE and the processor. The DBE also includes doorbell registers for receiving an indication from the processor that an event has occurred, such as a new request packet has been linked to the request queue. For example, after a request packet is queued onto the request queue by the processor, the processor rings the a request doorbell. Because the packets are linked and the DBE maintains the location of the next packet, in response, the DBE simply pulls in the packet from memory and presents it to the I/O device. The command or data is contained in the packet.

Because a single I/O device may provide multiple functions, there are multiple request channels available with each request channel having a request buffer, a request doorbell and corresponding head and tail registers.

The packets include a header for carrying information about the packet. Packets can be designated as asynchronous, interrupt or polled packets. Asynchronous packets are useful for requests that do not require notification that the packet has been completed. Interrupt packets are useful for request packets that request completion notification. Unsolicited packets are also designated as interrupt packets. When an interrupt packet is completed, an interrupt is generated by the DBE to the processor. A polled packet is useful for requests that request completion notification, but not in the form of a hardware interrupt. This type of packets assists in avoiding the overhead associated with hardware interrupts.

A bit in the packet header indicates whether the polled packet has been completed. Thus, the processor must continuously read or "spin" on this address to receive the notification. To prevent the processor from taking memory bus bandwidth while polling the packet, the packet header is designed to conveniently reside in a cacheline of the processor. Hence, the processor will poll on its cache until a cache miss occurs when the bit is changed by the DBE.

BRIEF DESCRIPTION OF THE DRAWINGS

A better understanding of the present invention can be obtained when the following detailed description of the preferred embodiment is considered in conjunction with the following drawings, in which:

FIGS. 8A–8G are block diagrams, flow charts, state transition conditions and outputs of the request queue front end state machine and posted queue front end state machine of the DBE device according to the preferred embodiment;

FIGS. 9A–9G are block diagrams, state diagrams, state transition conditions and outputs for the request queue back end state machine and posted queue back end state machine of the DBE device according to the preferred embodiment;

FIGS. 10A–10E-2 are a block diagram flow chart, state diagram, state transition conditions and outputs of the completion queue state machine of the DBE device according to the preferred embodiment;

FIG. 10B is a flow diagrams illustrating processes of the bus master interface of FIG. 7 according to the preferred embodiment;

DETAILED DESCRIPTION OF THE PREFERRED EMBODIMENT

Figure 1:
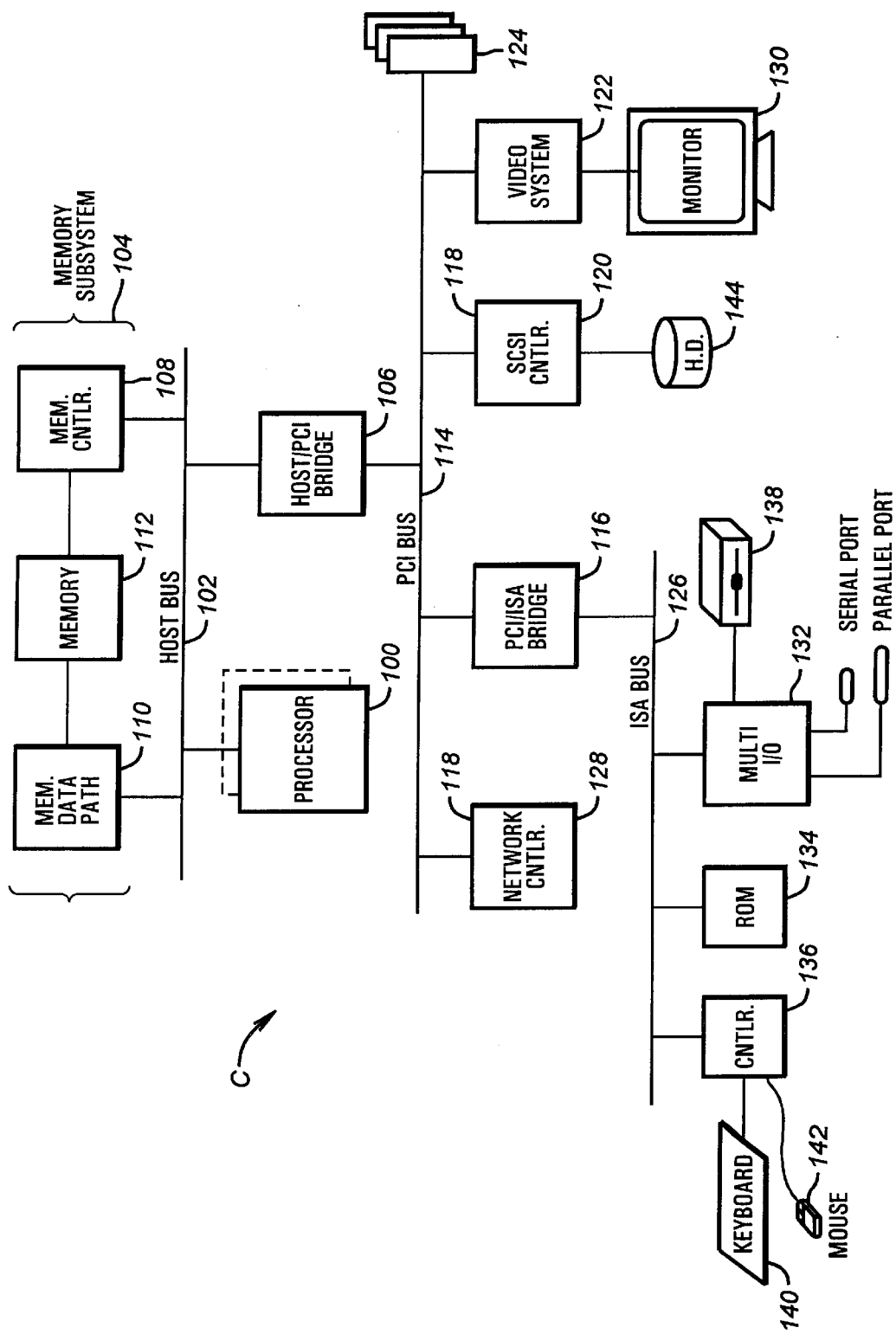
FIG. 1 is a block diagram of a computer system C according to the present invention.

Turning now to the drawings, a computer system C according to the preferred embodiment of the present invention is illustrated. The computer system C includes one or more processors 100, such as an Intel Pentium Pro processor, or the like. Although only one processor 100 is shown, the present invention is not limited to single processor computers. The processor 100 is coupled to a host bus 102.

Also coupled to the host bus 102 is a memory subsystem 104 and a host-to-PCI bridge device 106, such as an Intel 82454KX or the like. The host-to-PCI bridge device translates processor cycles into peripheral component interconnect (PCI) cycles, and vica versa, for connecting to a PCI bus 114. The memory subsystem 104 is itself comprised of a memory controller 108, such as an Intel 82453KX or the like, a memory data path device 110, such as an Intel 82452KX or the like, and a main memory array 112. The memory controller 108 provides address and control signals to the main memory 112, which is comprised of a plurality of dynamic random access memory (DRAM) devices (not specifically shown). The memory data path device 110 works in conjunction with the memory controller 108 to provide buffering between a data portion of the host bus 102 and the plurality of DRAMs. Of course, other well known variations of memory subsystems could be utilized. One alternative memory system not well known but contemplated herein is disclosed in U.S. patent application Ser. No. 08/940,914, by Mark W. Welker, Thomas J. Bonola, and Michael P. Moriarty, entitled MULTIMEDIA COMPUTER ARCHITECTURE, filed on Nov. 30, 1997, and hereby incorporated by reference.

Also connected to the PCI bus 114 is a PCI/ISA (industry standard architecture) bridge 116, one or more PCI bus masters 118, such as a small computer system interface (SCSI) controller 120 and a network interface controller 128. Further connected to the PCI bus 114 are a video system 122 and one or more PCI slots 124. The PCI/ISA bridge 116 translates PCI cycles into ISA bus cycles, and vica versa, for connecting to an ISA bus 126. The PCI/ISA bridge 116 also integrates an enhanced direct memory access (DMA) controller, an interrupt controller, a timer/counter, and non-maskable interrupt logic as well as decode logic for various peripheral devices. The SCSI controller 120 is connectable to a SCSI peripheral, such as a hard disk 144, tape drive and CD-ROM. The video system 122 includes a video controller, frame buffer and various logic for connecting to a monitor 130. The network interface controller 128 includes various interface circuitry for connecting to an ethernet network, or alternatively, a token ring network. The SCSI controller 120 and network controller 128 are but two of many examples of bus masters, which are collectively called PCI bus masters 118. It is noted that principles disclosed herein are applicable to other buses besides the PCI bus 114 that support bus mastering, such as ISA or EISA.

The ISA bus 126 further connects to a multi I/O device 132, a read only memory (ROM) 134 and a keyboard controller 136. The multi I/O device includes a floppy disk controller for connecting to a floppy disk drive 138. Also contained in the multi I/O device are a number of serial port and parallel port circuits. The ROM provides low level code for initiating the hardware upon power up. The keyboard controller handles communication with a keyboard 140 and a mouse 142.

System Architecture

Figure 2A:
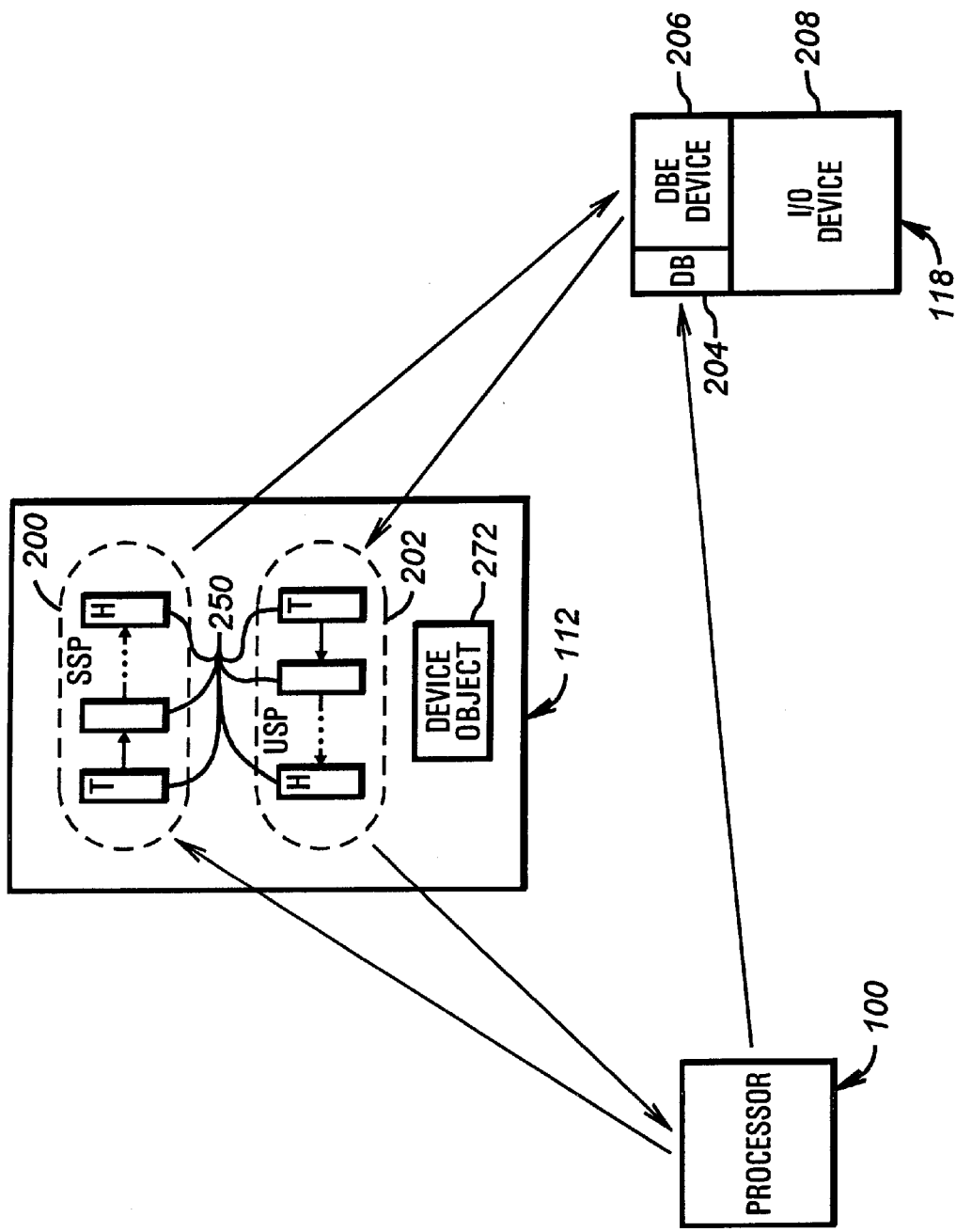
FIG. 2A is a block diagram illustrating the system architecture of the present invention according to the preferred embodiment.

Reference is directed to the flow diagram of FIG. 2A. Of particular interest to the present application is the way in which the processor 100 communicates with PCI bus masters 118, and vica versa. For each PCI bus master 118, there is developed in main memory 112 at initialization time a solicited packet pool 200 and an unsolicted packet pool 202. The area of memory 112 containing the packet pools is shared between the processor 100 and a PCI bus master 118. The solicited packet pool 200 contains one or more packets 250 used by the processor 100 to solicit data to/from the target PCI bus master 118. The unsolicited packet pool 202 contains two or more packets 250 used by the PCI bus master 118 to communicate unsolicited data to the processor 100. Unsolicited data is data received spontaneously by the PCI bus master 118 from an asynchronous data source, such as the data received by a mouse 142 or network controller 128.

The packets 250 comprising a packet pool are linked at initialization time to form a list. Each list has a head H and tail T pointer to which other packets 250 can be linked. Packets 250 residing in the solicited packet pool 200 are preferrably the same length and linked together with virtual addresses. Packets 250 residing in the unsolicited packet pool 202 are preferrably the same length but are linked together with physical addresses.

To facilitate the movement of packets between memory 112 and the PCI bus master 118, each PCI bus master 118 preferrably includes a distributed burst engine (DBE) 206. The DBE 206 is essentially an intelligent direct memory access (DMA) controller for an I/O device 208. The DBE's function is to retrieve, complete and send packets 250 without intervention from the processor 100. The I/O device 208 is essentially a conventional I/O controller, such as a SCSI controller, adapted to communicate with the DBE 206.

Each DBE 206 contains one or more doorbell registers 204. A doorbell 204 is "rung" by the processor 100 to notify the target I/O device 208 that one or more packets 250 have been prepared and are available in memory 112. Thereafter, the I/O device 208, via the DBE 206, pulls or reads the packets from memory 112 to process the packets 250 according to their contents.

If the I/O device 208 receives data from an external source, an unsolicited packet is prepared and placed in memory 112 by the DBE 206. After the DBE 206 places the unsolicited data packets in memory 112, the processor 100 is interrupted to notify the processor 100 that packets are available for processing.

One or more logical communications channels 214 may exist between the processor 100 and the I/O device 208. For example, an I/O device 208 may have one channel 214 devoted to incoming data, another channel 214 for outgoing data and a third channel 214 for command and control.

Therefore, direct communication between the processor 100 and PCI bus master 118 is reduced or limited by the command packet architecture. This decoupling of the processor 100 and PCI bus masters 118 by way of the command packet architecture results in a number of benefits, including: reduced hardware interrupts, greater performance for processor 100 intensive applications such as graphics and audio, and eliminated processor 100 reads from target I/O devices 208.

Figure 2B:
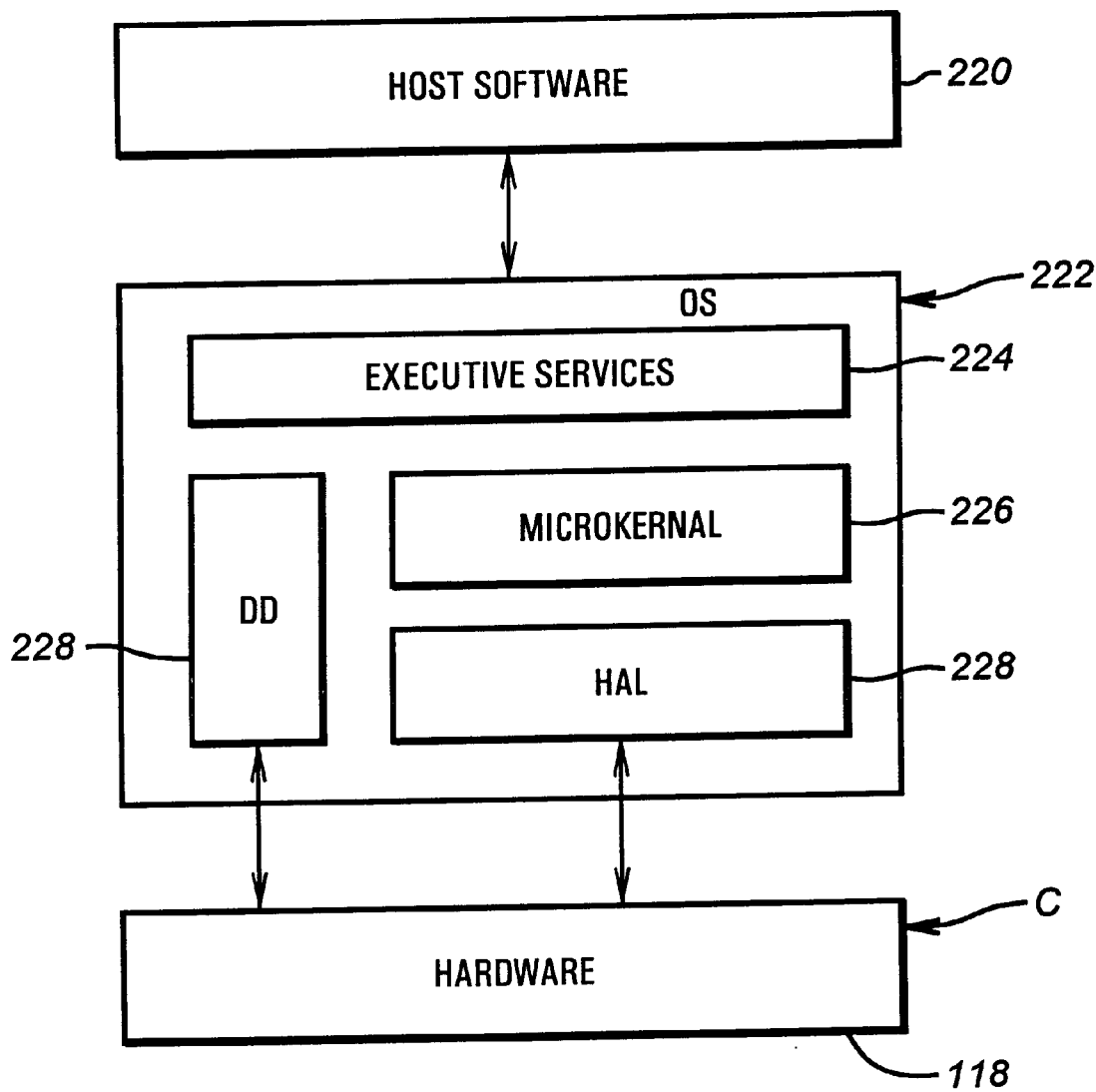
FIG. 2B is a block diagram illustrating the software system architecture of the present invention according to the preferred embodiment.

Referring now to FIG. 2B, there is illustrated how the device driver of the present invention communicates with memory 112. In the prior art, the processor 100 would communicate directly with an I/O device through a device driver which would configure memory mapped I/O registers on the I/O device to cause the I/O device to perform an operation. After the operation was completed, the I/O device would interrupt the processor 100 which in turn would cause the processor 100 to check status registers on the I/O device as to the source of the interrupt.

According to the preferred embodiment of the present invention, requests are generated from a host software application 220 to an operating system (OS) 222, such as Windows NT. The OS 222 is generally comprised of a kernel which includes certain executive services 224, a microkernel 226, a hardware abstraction layer (HAL) 228 and an I/O system having one or more device drivers 230. The device drivers 230 are allowed to communicate directly with hardware C, such as memory 112 and the PCI bus master 118. It is understood that for each PCI bus master 118 there is at least one device driver 230. The device driver 230 for a DBE device 206 is not required to run at any special processor 100 privilege level ("ring" level on an Intel processor). The driver 230 can execute in kernel or user mode.

A device driver 230 herein refers to that class of device drivers well know in the art for operating systems such as Windows, Windows NT, OS/2 and the like. However, it is understood that a device driver 230 written in accordance with the present invention would not be well known in the art. The disclosure herein provides sufficient guidance for one skilled in the art to develop a device driver in accordance with the present invention.

The device driver 230 can be viewed as having six primary functions with respect to interacting with the DBE device 206 and host software 220. These functions are initialization/deinitialization, packet submission, packet completion, synchronized direct access, packet cancellation and increase/decrease packet pools.

The driver 230 must initialize the DBE device 206 and I/O device 208 during system initialization. Once the DBE device 206 and I/O device 208 are initialized and can accept requests, the driver 230 can initiate device requests and the DBE device 206 can initiate data transfers. The device driver 230 can then perform the appropriate completion sequence for the packets. These details are discussed below.

It is noted that since the device driver 230 preferrably executes on the processor 100, the terms can be used interchangeably when referring to packet processing performed by the operating system 222. Additionally, the term "host" is sometimes used to logically refer generally to the processor 100, host software 220 and device driver 230. In such cases, the number designation will be the same as the processor 100, i.e. host 100.

Packets

Figure 3:
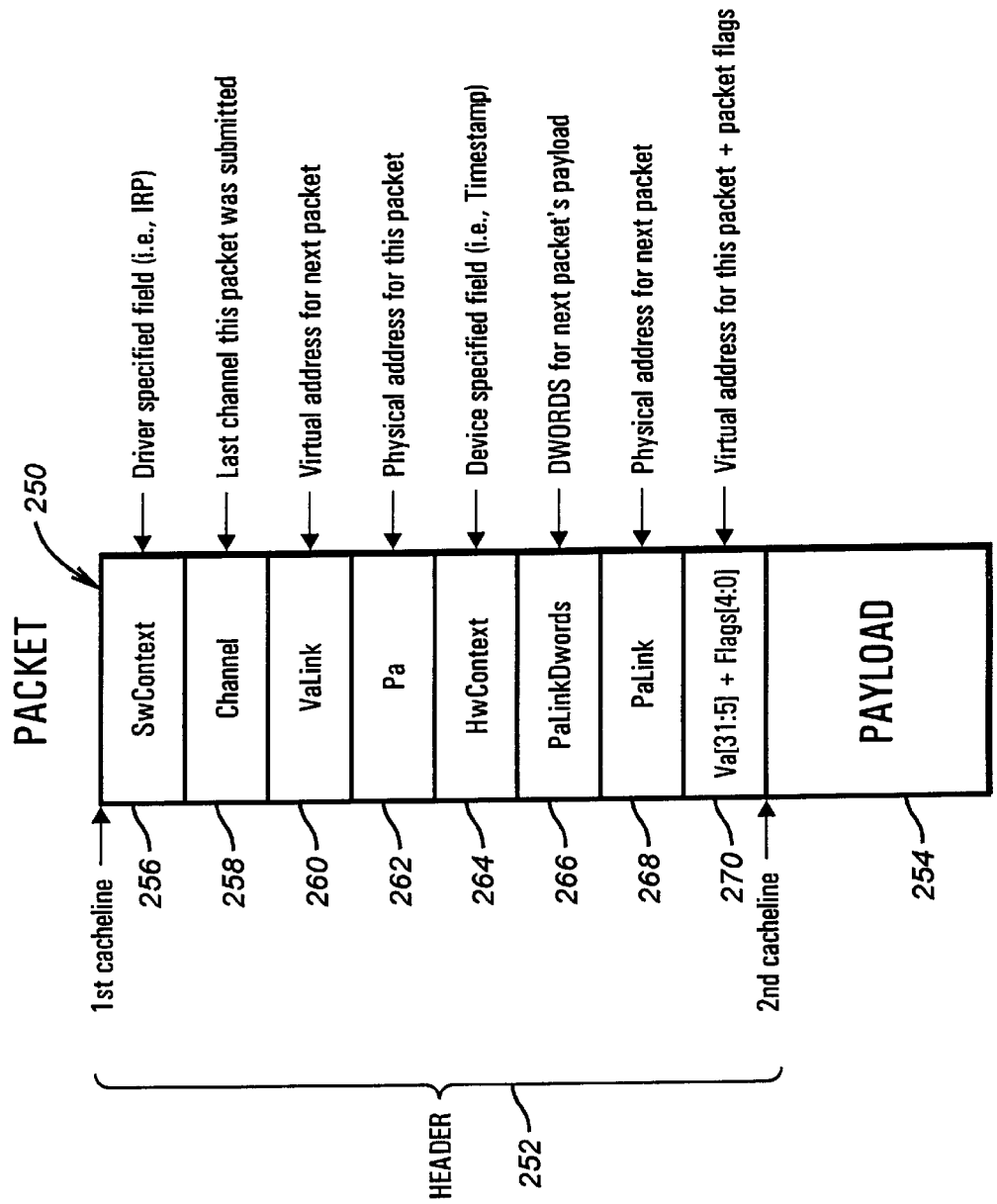
FIG. 3 is a block diagram illustrating a packet architecture according to the preferred embodiment.

Before proceeding with further detail on the DBE 206, it is necessary to understand more details of a packet 250. Referring now to FIG. 3, there is illustrated a packet 250 according to the preferred embodiment. The packet 250 is comprised of two main parts—a 32 byte header 252 and a variable size payload 254. Each packet is aligned to a 64 byte boundary, or Pentium cacheline. In this way, the first cacheline contains the header 252 and subsequent cachelines may contain the payload 254. The payload 254 holds the device specific data which can range from 4 to 256 bytes, in 4 byte increments.

The header 252 is comprised of eight 32-bit fields, including a software context (SwContext) field 256, a channel field 258, a virtual address link (VaLink) field 260, a physical address (Pa) field 262, a hardware context (HwContext) field 264, a physical address link Dword (PaLinkDwords) field 266, a physical address link (PaLink) field 268 and a virtual address (Va) field 270. The link fields allow linked lists of packets to be developed.

The SwContext field 256 is a 32-bit field reserved for use by host software 220 in any way it sees fit. Software might use this field to embed OS specific information associated with this packet 250. An example would be to place the virtual address of an I/O request packet (IRP) associated with the I/O request within the packet 250. This would allow the device driver 230 to directly recover the I/O request packet during I/O completion without having to manage a list of outstanding requests.

The Channel field 258 is a 32-bit field containing the number of the last channel 214 the packet was associated with. The channel 214 is a logical communications link. Each I/O device 208 may have more than one channel 214. In turn, a DBE 206 supporting one or more I/O devices may have more than one channel 214. For example, one channel 214 might be allocated for data transfers while another channel 214 might be allocated for command and status. This field contains "0" for packets in the unsolicited packet pool 202.

The Va field 270, VaLink field 260, Pa field 262 and PaLink field 268 are contained within the packet header 252 to eliminate multiple address translations between physical and virtual memory. Physical memory is memory 112. Pentium and equivalent processors 100 employ a hardware memory management mechanism for making efficient use of physical memory 112. Typically, programs executing on the processor 100 do not directly address physical memory 112, but instead access memory 112 using virtual addresses. By providing both the virtual and physical address fields within each packet 250, the translation need only be performed once when the packets 250 are initialized. This way, the device driver can operate with virtual addresses and the DBE 206 can operate with physical addresses, each communicating with the same packets 250.

The Va field 270 is a 32-bit field comprised of the following fields:

| Bit | Description |
| --- | --- |
| 31:6 | Contains a virtual address for this packet as viewed by the device driver. |
| 5 | Reserved |
| 4 | 0 - Process packet<br>1 - Cancel packet<br>Cancellation bit. Represents the processing state of the packet. The device driver sets this bit to indicate to the DBE device 206 that the packet 250 should not be processed and should be completed immediately. |
| 3 | 0 - Normal submission<br>1 - Begin Direct Access<br>Direct access bit. Indicates to the DBE device 206 that the driver will perform a direct access after completion of this packet. When received, the DBE 206 will not pull any more data until direct access is ended. If "1", this packet is completed immediately. |
| 2:1 | 00 - Null submission state<br>01 - Asynchronous packet<br>10 - Polled packet<br>11 - Interrupt packet<br>Submission type bits. Contains the value representing how this packet was submitted to the DBE device. A packet in the unsolicited pool will have all zeros in this field. |
| 0 | 0 - Unsolicited packet pool<br>1 - Solicited packet pool<br>Packet Type bit. Indicates which pool the packet belongs to. |

The VaLink field is a 32-bit field containing a virtual address of the next packet in a list. The field is null if there are no packets linked. This field is used by the DBE device 206 to link free packets back on the solicited packet pool 200 when completed by the DBE device 206. Free packets are packets that have been completed and are now "free" to use again. Although the DBE 206 device does not necessarily comprehend virtual addressing, it can link packets 250 with virtual addresses by simply reading and writing the virtual addresses contained in the packets 250.

The Pa field 262 is a 32-bit field containing the physical address of the packet 250. This is the address seen and used by the DBE device 206.

The PaLink field 268 is a 32-bit field containing the physical address of the next packet 250 in a list.

The HwContext field 264 is a 32-bit field reserved for use by a particular implementation of a DBE device 206 in any way it sees fit. For example, this could be used to embed an address to an uncached memory range so that packets 250 could be created without a payload 254.

The PaLinkDwords field 266 is a 32-bit field containing the size of the next packet's payload 254. The size is preferably expressed as a number of consecutive 4-byte chunks.

Thus, a packet structure and protocol is defined which allows a device driver 230 to communicate packets with an I/O device 208. Upon device initialization, the processor 100 develops a particular number of packets for the I/O device 208. The device driver 230 then communicates with the I/O device 208 by writing commands and data into packets 250 stored in memory 112 and notifying the DBE 206 that a packet 250 is ready to be processed. The DBE 206 reads the packet 250 from memory 112 and parses it to determine what operation was requested by the driver 230. Depending on how the packet 250 was issued to the DBE 206 determines how the DBE device will complete the operation and return the packet 250 to memory 112 for the driver 230.

Packets 250 can be submitted in one of three ways as indicated in the Va field 270: asynchronous, polled or interrupt. The device driver 230 submits asynchronous packets when completion notification is not required or desired. A bit-blit (BLT) operation for the graphics controller 122 is one example.

The device driver 230 submits interrupt packets when it requires completion notification by means of a hardware interrupt asserted by the I/O device 118.

The device driver 230 submits polled packets for those situation where the host software 220 requires polling. In certain cases, polled packets provide a more efficient means completion notification. For example, typical requests for the SCSI controller 120 are "sector read" and "sector write" operations. Most prior art operating systems provide a list of physical pages representing the calling application's target buffer for reading or writing the sector data requiring the device driver to "wait" for the request to complete. Upon notification by the disk device indicating request completion, the driver can release the memory for the calling application's target buffer. Based on the target device, it may be more efficient for the driver to "wait" for completion notification by "polling" on the specific operation rather than incurring a context switch as a result of a hardware interrupt. Hence, the present invention provides a way for the device driver 230 to submit a request to the DBE device 206 and poll on the packet 250 until the I/O device 208 finishes the request.

Packet Queues

Figure 4:
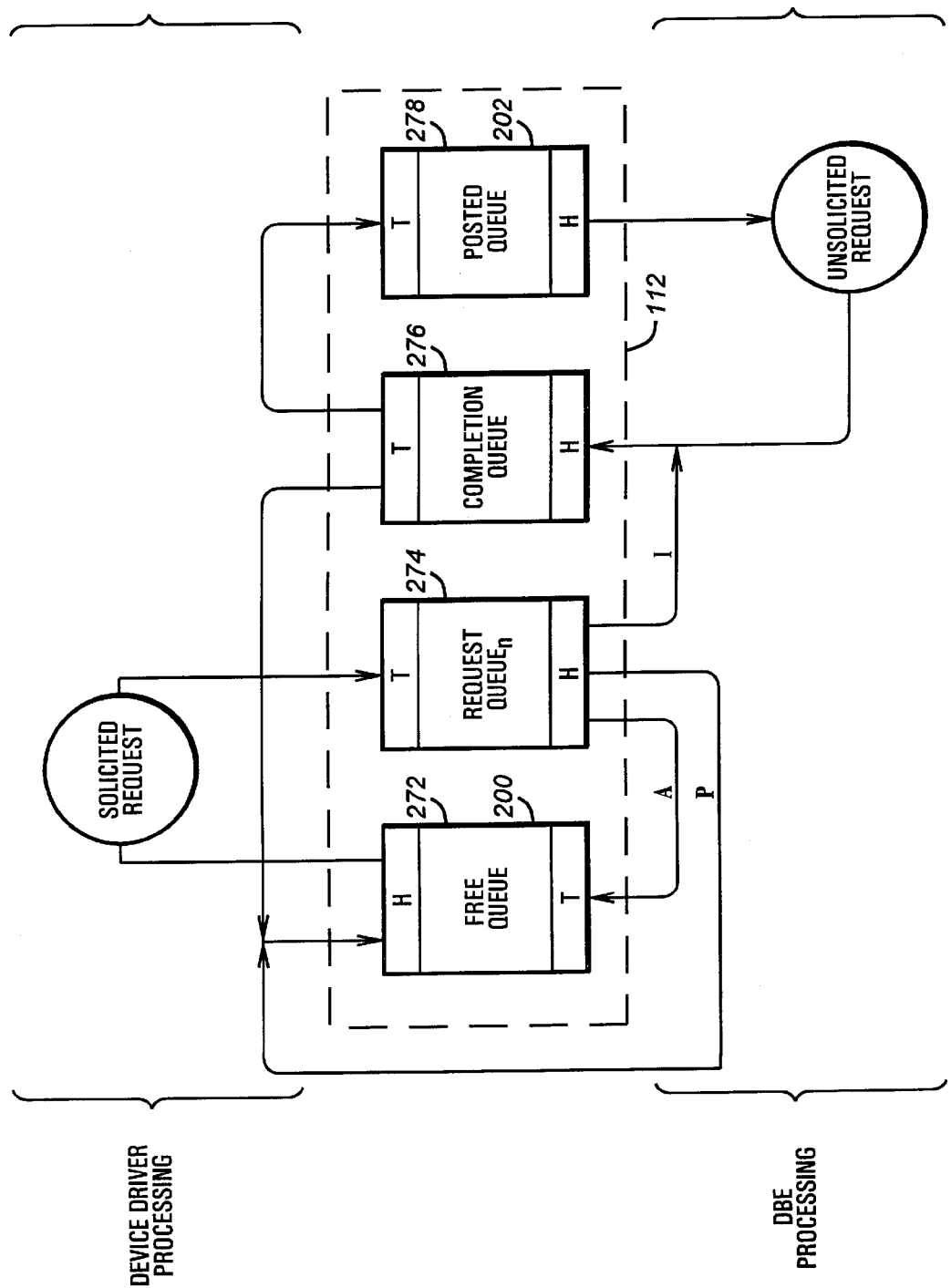
FIG. 4 is a block diagram illustrating the packet queues according to the preferred embodiment.

Upon initialization, the device driver 230 forms the solicited packet pool 200 and unsolicited packet pool 202. Referring now to FIG. 4, there is illustrated further detail regarding the formation of these linked lists of packets. In order to manage the flow of packets both between the device driver 230 and memory 112, and the DBE device 206 and memory 112 there are four queues 272–278 formed: a free queue (FQ) 272, a request queue (RQ) 274, a completion queue (CQ) 276 and a posted queue (PQ) 278. The free queue 272 is the same as the solicited packet pool 200 and the posted queue 278 is the same as the unsolicited packet pool 202. Each of these four queues 272–278 have a head H and tail T pointer.

The device driver 230 maintains the head H of the free queue 272 and the tail T of the remaining three queues 274–278. The DBE device 206 maintains the tail T of the free queue 272 and the head H of the remaining three queues 274–278.

The free queue 272 contains packets 250 which are available for the device driver 230 to use for communication with the DBE device 230. As requests are solicited from host software 220, the device driver 230 unlinks packets 250 from the head H of the free queue 272, fills in the packet's payload 254 and links the packets 250 to the tail T of the request queue 272. Packets 250 may be submitted either asynchronously (A), polled (P) or interrupt (I).

The DBE device 206 processes solicited requests by unlinking the packets 250 from the request queue 274, passing the payload 254 onto the I/O device 208 and completing the packets 250 according to their submission method. More specifically, asynchronous packets A are completed to the tail T of the free queue 272 without notification to the device driver 230. Polled packets P are returned to the head H of the free queue 272 by the device driver 230 and interrupt packets I are completed through the completion queue 276.

For interrupt packets, after the DBE device 206 has linked an interrupt packet I to the head H of the completion queue, a hardware interrupt may be generated. If the completion queue 276 is empty, an interrupt is generated when a packet 250 is linked. If the completion queue 276 is not empty, then subsequently linked packets do not generate an interrupt. The device driver 230 unlinks packets 250 from the completion queue 276, removes the payload 254 and returns the packets to either the free queue 272 or the posted queue 278 based on bit 0 of the Va field 270.

The posted queue 278 holds packets 250 for unsolicited requests. When an unsolicited request is generated, the DBE device 206 unlinks a packet 250 from the posted queue 278, fills the payload 254 with data and links the packet 250 to the completion queue 276. If a list of packets is not already on the completion queue 276, a hardware interrupt is generated.

Software Interface to DBE

The DBE device 206 is abstracted to the device driver 230 through a DBE device object 272 (FIG. 2A). The DBE device object 272 contains the relevant data structures and resources required to manage the packet protocol between the driver 230 and DBE device 206. The DBE device object 272 is stored in memory 112 and managed by the DBE device driver 230.

The DBE device object 272 corresponds to a specific DBE device 206 within the computer system C. The DBE device 206 has no concept of this data structure. The object 272 is created and used only by the device driver 230 to manage the target DBE device 206 resources. Changing the memory format of the DBE device object will not affect the device unless new functionality is required by the device. The DBE object 272 is aligned to a Pentium cache line boundary to reduce the number of cache line fills on frequently referenced adjacent data items. The DBE device object 272 is comprised of the data structure listed in Table 2.

| Parameter | Description |
| --- | --- |
| DeviceID | A 32-bit field used as this DBE object's unique device ID. |
| FreeQueue | A 32-bit memory location containing fields to manage the free queue, including the address for the head packet. |
| CompletionQueue | A 32-bit memory location containing fields to manage the completion queue, including the address for the tail packet. |
| RequestQueue | A 32-bit memory location containing fields to manage the request queue, including the address for the tail packet. |
| PostedQueue | A 32-bit memory location containing fields to manage the free queue, including the address for the posted packet. |
| RegistersVa | A 32-bit memory location containing fields to hold the virtual addresses of the DBE device 206 registers. |
| RegistersPa | A 32-bit memory location containing fields to hold the physical addresses of the DBE device 206 registers. |
| MmioAddressRange | A 32-bit memory location containing the range in bytes required to map the DBE device registers. |
| RequestPacketCount | A 32-bit memory location containing the number of packets allocated to the solicited packet pool. |
| RequestPacketSize | A 32-bit memory location containing the Dword size of the DeviceContext field for each packet of the solicited packet pool. |
| PostedPacketCount | A 32-bit memory location containing the number of packets allocated to the unsolicited packet pool. |
| PostedPacketSize | A 32-bit memory location containing the Dword size of the DeviceContext field for each packet of the unsolicited packet pool. |
| DbeFlink | A 32-bit memory location containing a pointer to the a DBE device object in front of this one. |
| DbeBlink | A 32-bit memory location containing a pointer to the a DBE device object in back of this one. |
| DummyPacket | This field points to a dummy command packet used by the device driver to ensure a packet on the tail of the request queue does not reference itself. This condition can occur if the last submitted packet is returned to the free queue before another packet gets allocated and submitted to the device. The DBE_AllocatePacket routine checks for this condition before returning the packet address to the caller. If the packet removed from the free queue happens to be the last packet submitted to the DBE device, the DBE_AllocatePacket routine swaps the removed packet address with the DummyPacket address. |

DBE Device Interface

Figure 5:
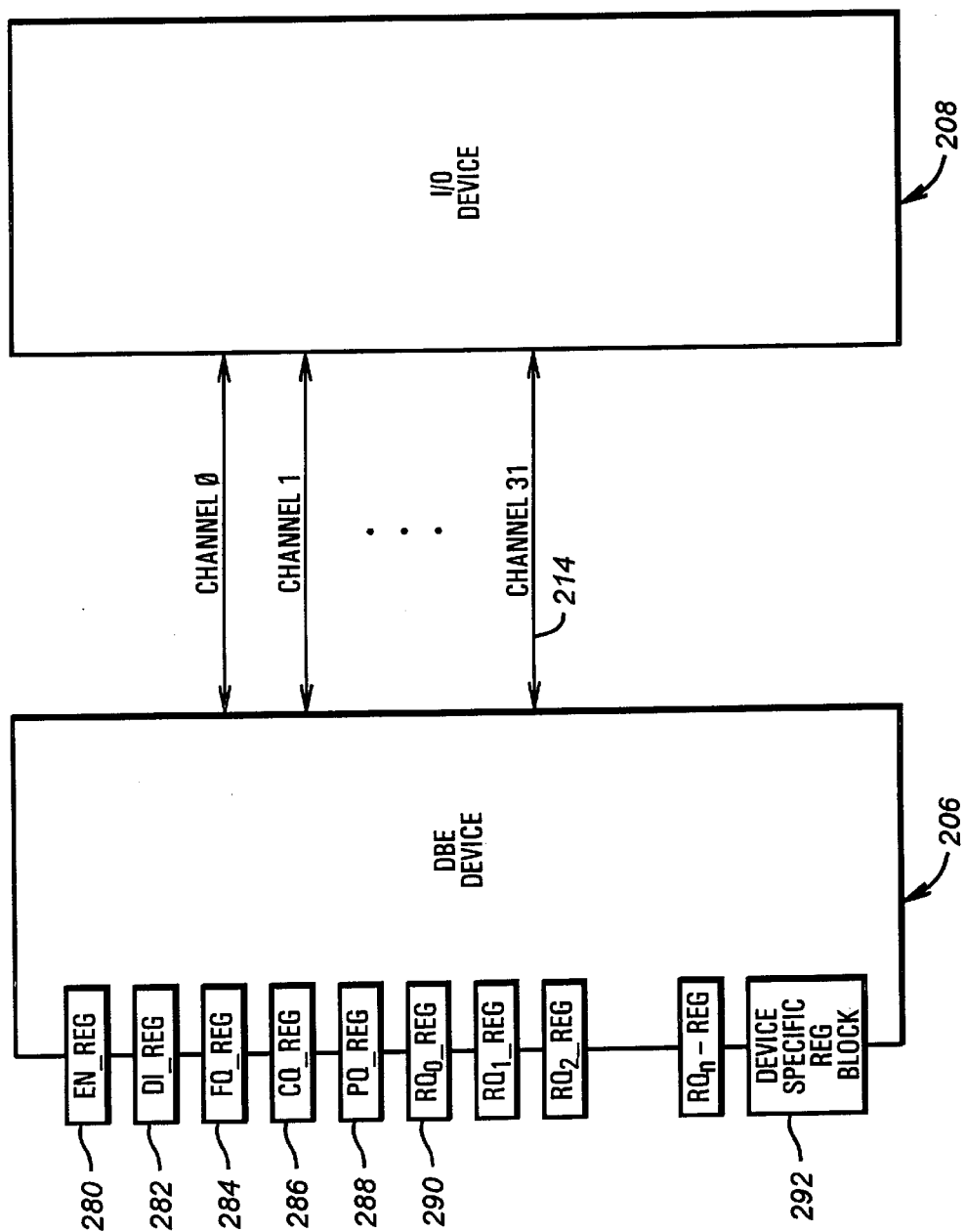
FIG. 5 is a block diagram illustrating the hardware registers of the DBE device according to the preferred embodiment.

Referring now to the DBE device 206, attention is directed to FIG. 5 where there is illustrated a register interface of the DBE device 206. The DBE device 206 includes a set of memory mapped I/O registers 280–292 to facilitate the DBE protocol. The device driver 230 corresponding to the DBE device 206 writes configuration information to the registers 280–292 during system initialization. The registers 280–292 are accessable to both the processor 100 (device driver) and the DBE device 206. The registers include an event enable register (EN_REG) 280, an event disable register (DI_REG) 282, a free queue tail register (FQ_REG) 284, a completion queue head register (CQ_REG) 286, a posted buffer queue head register (PQ_REG) 288 and one or more request queue head registers (RQ$_n$_REG) 290.

The event enable register (EN_REG) 280 is a 32-bit register for containing implementation specific information. Bits 31:2 are available for customization. Bits 1:0 are defined below. This register has the attributes of being a 32 bit, read/write, bit mapped and memory mapped I/O register. The bit definitions are as follows:

| | EN_REG | |
|---|---|---|
| Bit | Processor cycle | Description |
| 0 | W | 0 - no affect on this bit |
| | | 1 - places the DBE device into RESET |
| 0 | R | 0 - DBE device is not in RESET |
| | | 1 - DBE device is in RESET |
| 1 | W | 0 - No affect on this bit |
| | | 1 - Enables the DBE device interrupt to the host processor |
| 1 | R | 0 - DBE device interrupt is not enabled |
| | | 1 - DBE device interrupt is enabled |
| 31:2 | R/W | these bits are defined for custom use |

The event disable register (DI_REG) 282 is used by the device driver 230 to disable the events enabled by the EN_REG 280. The EN_REG 280 and DI_REG 282 registers are implemented to eliminate read/modify/write operations normally required to atomically affect the individual bit positions for set/clear operations to the same register. This register has the attributes of being a 32 bit, read/write, bit mapped and memory mapped I/O register. The bit definitions are as follows:

| | DI_REG | |
|---|---|---|
| Bit | Processor cycle | Description |
| 0 | W | 0 - No affect on this bit |
| | | 1 - Takes the DBE Device out of RESET |
| 0 | R | 0 - DBE Device is still in RESET |
| | | 1 - DBE Device is out of RESET |
| 1 | W | 0 - No affect on this bit |
| | | 1 - Disables the DBE Device Interrupt to the host processor |
| 1 | R | 0 - DBE Device interrupt is enabled |
| | | 1 - DBE Device interrupt is disabled |
| 31:2 | R/W | these bits are defined for custom use |

The free queue tail register (FQ_REG) 284 is a 32-bit register for storing the physical address of the last packet 250, or tail packet T, on the solicited packet pool 200. The register is initialized by the device driver 230 during system initialization. Thereafter, the register is maintained by the DBE device 206. To implement this procedure, the DBE device 206 latches processor 100 writes to bits [31:5] of this register when the DBE device 206 is in RESET mode (EN_REG[0]="1"). The DBE device 206 assumes bits [4:0] of the physical address contain "0's."

The DBE device 206 completes asynchronous packets (discussed below) to the tail T of the solicited packet pool 200 without sending notification back to the device driver 230. The device driver 230 should keep at least one free packet 250 on the solicited packet pool 200 for the DBE device 206 to have a place to link completed asynchronous packets 250. This register has the attributes of being a 32 bit, read/write, bit mapped and memory mapped I/O register. The bit definitions are as follows:

| | FQ_REG | |
|---|---|---|
| Bit | Processor cycle | Description |
| 31:5 | W | Pentium cacheline aligned physical address of the packet on the tail of the solicited packet pool. Writes are only latched by the DBE device in RESET mode |
| 4:0 | W | Always ignored by the DBE device |
| 31:0 | R | Yields the physical address of the last packet on the solicited packet pool |

The completion queue register (CQ REG) 286 is a 32-bit register for storing the physical address of a completion list head located in memory 112. The CQ_REG 286 is initialized by the device driver 230 with the 4-byte aligned physical address of the location to place the head of a completion list built by the DBE device 206. Thereafter, the CQ_REG 286 is maintained by the DBE device 206. To implement this procedure, the DBE device 206 latches processor 100 writes to bits [31:2] of this register when the DBE device 206 is in RESET mode (EN_REG[0]="1"). The DBE device 206 assumes bits [1:0] of the physical address contain "0's."

| | CQ_REG | |
|---|---|---|
| Bit | Processor cycle | Description |
| 31:2 | W | DWORD aligned physical address of the Completion queue head. Writes are only latched by the DBE device in RESET mode |
| 1 | W | 0 - Always ignored by the DBE device |
| 0 | W | 0 - No affect on this bit position |
| | | 1 - Sets the CQ doorbell ONLY when DBE device is out of RESET mode |
| 31:0 | R | Yields the current contents of this register |

The posted queue register (PQ_REG) 288 is a 32-bit register for storing the 32-byte aligned physical address of the first packet 250 in the unsolicited packet pool 202. The PQ_REG 288 is initialized by the device driver 230 during system initialization. Thereafter, the PQ_REG 288 is maintained by the DBE device 206. To implement this procedure, the DBE device 206 latches processor 100 writes to bits [31:5] of this register when the DBE device 206 is in RESET mode (EN_REG[0]="1"). The DBE device 206 assumes bits [4:0] of the physical address contain "0's." The DBE device 206 reads this register to determine where to write unsolicited data into memory 112.

| | PQ_REG | |
|---|---|---|
| Bit | Processor cycle | Description |
| 31:5 | W | Pentium cacheline aligned physical address of the first packet in the unsolicited packet pool. Writes are only latched by the DBE device in RESET mode |
| 4:1 | W | 0000 - Always ignored by the DBE device |
| 0 | W | 0 - No affect on this bit position |
| | | 1 - Sets the PQ doorbell ONLY when DBE device is out of RESET mode |
| 31:0 | R | Yields the current contents of this register |

The request queue head register (RQ$_n$_REG) 290 is a 32-bit register for storing the 32-byte aligned physical address of where the next request packet 250 has been placed by the device driver 230. Each RQ$_n$_REG 290 is initialized by the device driver 230 during system initialization with the physical address of a "dummy" packet 250 corresponding to channel$_n$. Thereafter, the RQ$_n$_REG 290 is maintained by the DBE device 206. To implement this procedure, the DBE device 206 latches processor 100 writes to bits [31:5] of this register when the DBE device 206 is in RESET mode (EN_REG[0]="1"). The DBE device 206 assumes bits [4:0] of the physical address contain "0's." The DBE device 206 uses this register to fetch packets 250.

| | | RQ$_n$_REG | |
|---|---|---|---|
| Bit | Processor cycle | Description | |
| 31:5 | W | Pentium cacheline aligned physical address of the "Dummy" packet for channel$_n$. Writes are latched by the DBE device in RESET mode | |
| 31:5 | R | Yields bits [31:5] of the physical address of the last request packet processed y the DBE device | |
| 4:2 | W | 0000 - Always ignored by the DBE device | |
| 4:2 | R | Always returns 000 | |
| 1 | W | 0 - No affect on this bit<br>1 - Ends synchronized direct access for channel$_n$ at the DBE device only when DBE device is out of RESET mode | |
| 1 | R | 0 - Channel$_n$ is synchronized for direct access<br>1 - Channel$_n$ is processing packets | |
| 0 | W | RQ_DOORBELL<br>0 - No affect on this bit position<br>1 - Sets the RQ$_n$ doorbell only when device is out of RESET mode | |
| 0 | R | RQ_DOORBELL<br>0 - Doorbell event cleared by the DBE device<br>1 - Doorbell event pending at the DBE device | |

Software Architecture

A set of routines is available to host software 220 so that the mechanics of the DBE protocol are hidden. Each routine includes an entrypoint for being called by the host software 220. The following describes each entrypoint.

DBE_AcknowledgeInterrupt

This routine returns a list of completed packets 250 and acknowledges the interrupt at the target DBE device 206. The routine can be called by the device driver's Interrupt Service Routine (ISR) or Deferred Procedure Call (DPC). The routine is called to remove a completion list from the Completion Queue Head located within the DBE device object handle. The caller does not have to provide synchronization.

DBE_Allocate Packet

This routine ATOMICALLY removes the first packet 250 from the head H of the solicited packet pool 200. This routine is called by the driver 230 when the driver wishes to solicit an operation to the target DBE device 206. The driver 230 would allocate a packet 250, fill it in for the specified solicited request, and issue it to the target DBE device 206 with one of the DBE submission routines. This routine does not require synchronization by the driver 230.

DBE_BeginDirectAccess

This routine synchronizes direct access to the DBE device 206 with packets 250 previously submitted to the solicited request channel specified by a channel parameter. The synchronization occurs by stopping input processing on the DBE device 206 for the specified channel 214 until the driver 230 calls DBE_EndDirectAccess for the specified channel 214. Normally, driver direct access does not require synchronization with solicited packets pending at the DBE device 230. The driver 230 calls this routine when its direct access is dependent on the completion of outstanding packets previously submitted to the specified solicited request channel 214. This routine does not block other threads from submitting requests to the specified solicited request channel 214.

DBE_CancelPacket

This routine marks the specified packet for cancellation. This routine is called by the driver when a previously submitted packet should not be processed by the target DBE device. The DBE device 206 then completes a canceled packet without bursting down the packet's payload 254. Packet completion is determined by how the packet 250 was submitted by the driver 230. The driver 230 is responsible for keeping track of the packets 250 pending at the DBE device 206 in order to implement an IO cancellation protocol. This routine only provides a way to mark the specified packet for IO completion.

DBE_CompletionListIsReady

This routine "peeks" at a Completion Queue Head for a completion list. This routine will not remove the completion list from the completion list queue. This routine is called by the driver 230 to check for a completion list on the Completion List Queue within the DBE device object 272. If the driver 230 wants to remove a completion list from the completion queue, it must call the DBE_AcknowledgeInterrupt routine.

DBE_DecreasePool

This routine removes packets from the specified packet pool. The DBE protocol defines two (2) pools of packets. One pool is for solicited requests to the DBE device and the other pool is for unsolicited data received from the DBE device.

DBE_Deinitialize

This routine deletes all allocated resources created by DBE Initialize for the target device.

DBE_FreePacket

This routine places the specified packet onto the head of the solicited packet pool.

DBE_EndDirectAccess

This routine starts the DBE state machines for the solicited request channel 214 specified by channel 214.

DBE_GetDevice

This routine scans the master list of all DBE devices in the system for a match on the specified device ID. This routine does not create the DBE device with the specified device ID. Instead, this routine searches for a DBE device with the specified device ID already created with the DBE_Initialize routine. This routine is multithread and multiprocessor safe.

DBE_GetHwContext

This routine returns the 32-bit contents of the hardware specific data field within the DBE packet header.

DBE_GetNextPacketToComplete

This routine retrieves the next packet in the list of completed packets and places the current packet back onto the appropriate packet pool. This routine returns the virtual address of the next packet on a completion list previously removed with the DBE_AcknowledgeInterrrupt routine. This routine is multithread and multiprocessor safe. Each execution context that removed a completion list with DBE_AcknowledgeInterrupt has exclusive ownership of the list.

DBE_GetSwContext

This routine returns the 32-bit contents of the software specific data field within the DBE packet header.

DBE_IncreasePool

This routine adds packets to the specified packet pool. The DBE protocol defines two (2) pools of packets. One pool is for solicited requests to the DBE device and the other pool is for unsolicited data received from the DBE device.

DBE_Initialize

This routine creates a DBE device object. This routine is called by the driver to create and initialize a DBE device object. This routine will not succeed if another DBE device already exists with the same device ID specified by DeviceID.

DBE_PacketIsBusy

This routine determines if the specified packet is pending at the target DBE device. This routine only tests bit 2 of the VaLink field 260 within the packet's header because only polled and interrupt packets require driver completion and acknowledgment. This routine will return NULL for packets 250 submitted as asynchronous packets.

DBE_SetHwContext

This routine sets the 32-bit contents of the hardware specific data field within the DBE packet header 252.

DBE_SetSwContext

This routine sets the 32-bit contents of the software specific data field within the DBE packet header 252.

DBE_SubmitPacketA

This routine issues a solicited packet to the target DBE device 206. This packet will automatically be recycled to the tail T of the solicited packet pool 200 by the DBE device 206 when the DBE device 206 completes the operation. This routine does not disable Processor interrupts and does not require a "spin" loop to synchronize access to the target solicited request queue.

DBE_SubmitPacketI

This routine issues a solicited packet to the target DBE device. This packet will be issued requesting a hardware interrupt from the target DBE device to acknowledge the completion of this packet. This routine returns to the caller immediately after issuing this request. The driver must acknowledge the completion of this packet through standard interrupt processing defined by the target operating system environment. This routine does not disable Processor interrupts and does not require a "spin" loop to synchronize access to the target solicited request queue. This routine is multithread and multiprocessor safe.

DBE_SubmitPacketP

This routine issues a solicited packet to the target DBE device. This packet will be issued as a "polled" request to the target DBE device. This routine returns to the caller immediately after issuing this request. The driver must acknowledge the completion of this packet with the DBE_PacketIsBusy routine. The driver must free the packet with DBE_FreePacket after performing any IO completion processing on the packet. This routine does not disable Processor interrupts and does not require a "spin" loop to synchronize access to the target solicited request queue.

DBE_SubmitPacketPdeferred

This routine issues a solicited packet to the target DBE device as a polled packet. This routine returns immediately to the caller to maximize processing overlap between the DBE device and Processor. This routine returns to the caller immediately after submission of this packet by the target DBE device. The DBE device indicates completion by clearing the "submission" bits (bits[2:1]) in the VaLink field of packet 250. The driver must free the packet with DBE_FreePacket after performing any 10 completion on the packet. This routine does not disable Processor interrupts and does not require a "spin" loop to synchronize access to the target solicited request queue.

The above entrypoints generally fall within one of the following categories: initialization/deinitialization, packet submission, packet completion, synchronized direct access, packet cancellation and increase/decrease packet pools.

Initialization/Deinitialization

The initialization/deinitialization routines are used by host software to perform initialization and deinitialization of the DBE hardware and software resources. The category includes the following three routines: DBE_Initialize, DBE_Deinitialize and DBE_GetDevice.

Host software calls DBE_Initialize during its initialization phase to create a DBE device object 272 handle and to setup the DBE hardware registers 280-292 with the appropriate address information to facilitate the automated DMA.

When host software 220 is reinitialized through system reboot or dynamic unloading by the OS 222, the DBE_Initialize routine must be called again to create a new connection to the target DBE device 206 and re-initialize the DBE hardware registers 280–292 with the new address information.

The DBE_Deinitialize routine is called by host software 220 to cleanup memory resources allocated for the target DBE device 206 and place the target DBE device 206 into RESET mode.

The DBE software architecture keeps track of all DBE device objects 272 created throughout the system. Host software 220 can establish a connection to a DBE device 206 already initialized by another software entity by calling the DBE_GetDevice. Host software 220 is not limited to calling this routine from within its initialization context. DBE_GetDevice can be called from within any execution context.

Packet Submission

The packet submission routines are used by host software to perform the allocation and submission of solicited packets to the DBE device 206. The category includes the following three routines: DBE_AllocatePacket, DBE_SubmitPacketA, DBE_SubmitPacketP, DBE_SubmitPacketPdeferred and DBE_SubmitPacketI.

Before host software 220 can submit a solicited request to the DBE device 206, it must allocate a solicited packet 250 from the solicited packet pool 200. Host software 220 calls DBE_AllocatePacket to remove an available packet 250 from the solicited packet pool 200. Software can specify a retry count or wait forever until a packet 250 becomes available. The DBE_AllocatePacket routine returns a pointer to the free packet's payload data area that can be used anyway the application/device define.

Once a free packet 250 is allocated, host software 220 fills in the packet's payload data area 254 with the relevant information required to carry out the solicited transaction to a specified solicited request channel 214. Host software 220 issues the packet 250 to the DBE device 206 one of three ways: asynchronous, polled, or interrupt.

Asynchronous packets do not require completion notification from the DBE device 206. Host software 220 submits asynchronous packets 250 when software does not require completion notification for the specified operation, such as when a graphics operation is requested. The DBE device 206 automatically places an asynchronous packet to the tail of the solicited packet pool 200 upon completion of the packet. Host software 220 issues an asynchronous packet with the DBE_SubmitPacketA routine. A typical asynchronous operation is a screen to screen BLT performed by the graphics device 122.

A polled request is issued by the device driver 230 when the driver 230 requires the I/O device 118 to indicate completion of the operation, but not in the form of a hardware interrupt. The device driver 230 will wait for the I/O device 118 to complete the operation by polling a cache based field in the packet header 252. Polled packets require completion notification from the DBE device 206 by clearing bits within the packet header 252. Host software 220 "spins" or polls on the submission bits (bits[2:1] of the Va+Flags field) within the packet header 252 until the DBE device 206 writes "00" to these bit positions upon completion of the packet 250. The driver 230 spins in its cache until an "invalidate" cycle with the modified data updates the cache line. This eliminates the need to poll the I/O device 118 directly and keeps the processor 100 off of the host bus 102.

Host software 220 issues a polled packet with the DBE_SubmitPacketP and DBE_SubmitPacketPdeferred routines. The DBE_SubmitPacketP routine provides the "spin" operation on the submission bits within the packet header 252 until the DBE device 206 clears these bits. The DBE_SubmitPacketPdeferred routine returns immediately after submitting the request to the DBE device 206. Host software 220 can continue processing other tasks while the packet 250 is being processed by the DBE device 206.

An interrupt request is issued by the device driver 230 when the host software 220 requires completion notification with a hardware interrupt. This is the more classical method of communication between a driver 230 and its target PCI bus master 118. The DBE device 206 completes interrupt requests by writing the virtual address of the completed packet into a known memory queue in system memory and asserting a hardware interrupt. The DBE device 206 can continue to complete requests even if the driver 230 has not yet serviced the previous completion. For this case, the DBE device 206 builds a list of completed packets in system memory and does not assert another hardware interrupt until the I/O device 118 indicates that the completion queue is ready to receive another list of completions. Host software 220 issues an interrupt packet by calling the DBE_SubmitPacketI routine. This routine returns immediately to the caller upon submission of the packet 250. Host software 220 handles the "posting" of the execution context pending the arrival of the requested interrupt event.

Packet Completion

The packet completion routines are used by host software to perform completion processing on packets 250 submitted to the DBE device 206. The category includes the following three routines: DBE_PacketIsBusy, DBE_FreePacket, DBE_CompletionListIsReady, DBE_AcknowledgeInterrupt and DBE_GetNextPacketToComplete.

Solicited packets 250 submitted asynchronously do not require completion processing by host software 220. The DBE device 206 automatically "frees" completed asynchronous packets 250 to the tail T of the solicited packet pool 200.

Polled packets 250 must be placed back onto the solicited packet pool 200 after any completion processing performed by host software 220. Software 220 calls DBE_FreePacket to place the completed packet 250 onto the head of the solicited packet pool 200.

Packets 250 issued with the DBE_SubmitPacketPdeferred routine must first call the DBE_PacketIsBusy routine before placing the packet 250 onto the head of the solicited packet pool 200 with DBE_FreePacket.

The DBE device 206 completes interrupt packets 250 by building a packet completion list and placing the head of this list into the Completion Queue Head located within the DBE Device Object 272. The DBE device 206 asserts a hardware interrupt to the processor 100 after placing the completion list into the Completion Queue Head to notify the host processor of the list.

Host software can "peek" at the Completion Queue Head to see if the DBE device 206 is really asserting its interrupt without actually removing the list from the Completion Queue Head by calling DBE_CompletionListIsReady. The DBE_AcknowledgeInterrupt routine is called by software 220 to remove the completion list from the Completion Queue Head and to acknowledge the DBE device interrupt. Once the list is removed, it can be "walked" by subsequent calls to DBE_GetNextPacketToComplete until it reaches the end of the completion list. The DBE_GetNextPacketToComplete "frees" the current packet by placing it onto the head of the solicited packet pool just after extracting the next packet to complete from it.

Synchronized Direct Access

The synchronized direct access is useful when the processor 100 requires direct access to shared DBE hardware resources. Host software 220 calls DBE_BeginDirectAccess to submit a polled packet 250 and cause the DBE device 206 for the specified channel(s) to stop processing subsequent packets 250. This permits host software 220 direct access to the target device hardware resources without contention between previously submitted packet operations and the direct access operations. Host software 220 ends the synchronized direct access to specified channel(s) by calling the DBE_EndDirectAccess routine.

Packet Cancellation

Packets 250 that have been issued to the DBE device 206 and still pending completion by the DBE device 206 can be canceled by host software by calling DBE_CancelPacket. The DBE device 206 should not burst a packet's payload 254 if the packet 250 is marked for 10 cancellation in the Va field 270. The canceled packet 250 will be completed immediately by the DBE device 206 according to how the packet 250 was submitted.

Increase/Decrease Packet Pools

Host software 220 can increase the amount of decoupling between itself and the target DBE device 206 by adding more packets 250 to the solicited 200 and unsolicited 202 packet pools. Software 220 calls DBE_IncreasePool to add more packets 250 to the specified pool. If software 220 discovers that there are too many packets 250 on the packet pools and some packets 250 can be given back to the OS memory manager, then host software 220 can call DBE_DecreasePool to remove packets 250 from the specified packet pool.

DBE Architecture

Figure 6A:
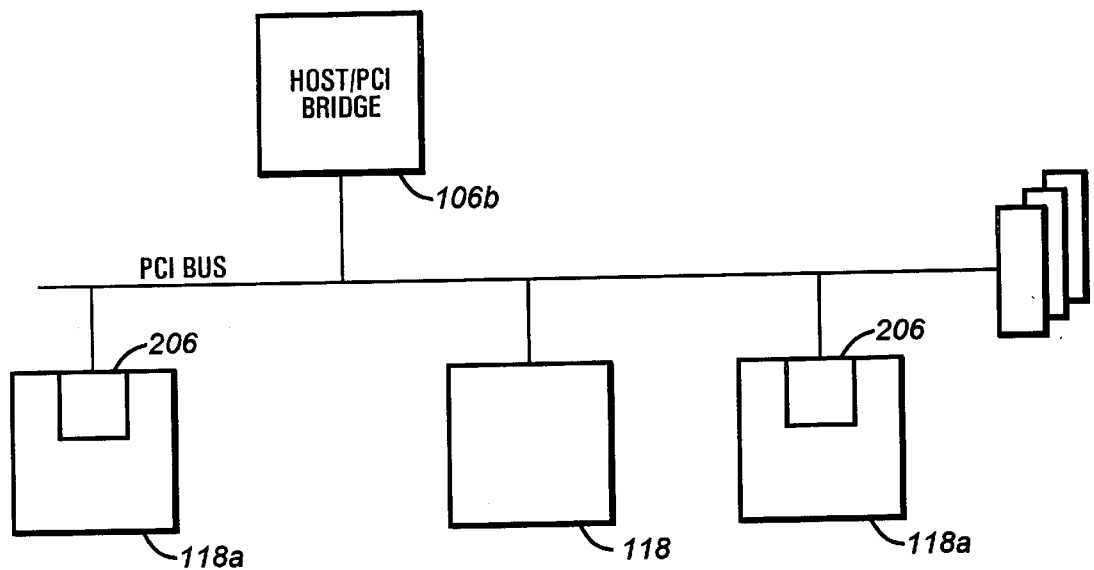
FIG. 6A is a block diagram illustrating a first arrangement of the DBE devices along a pci bus.
Figure 6B:
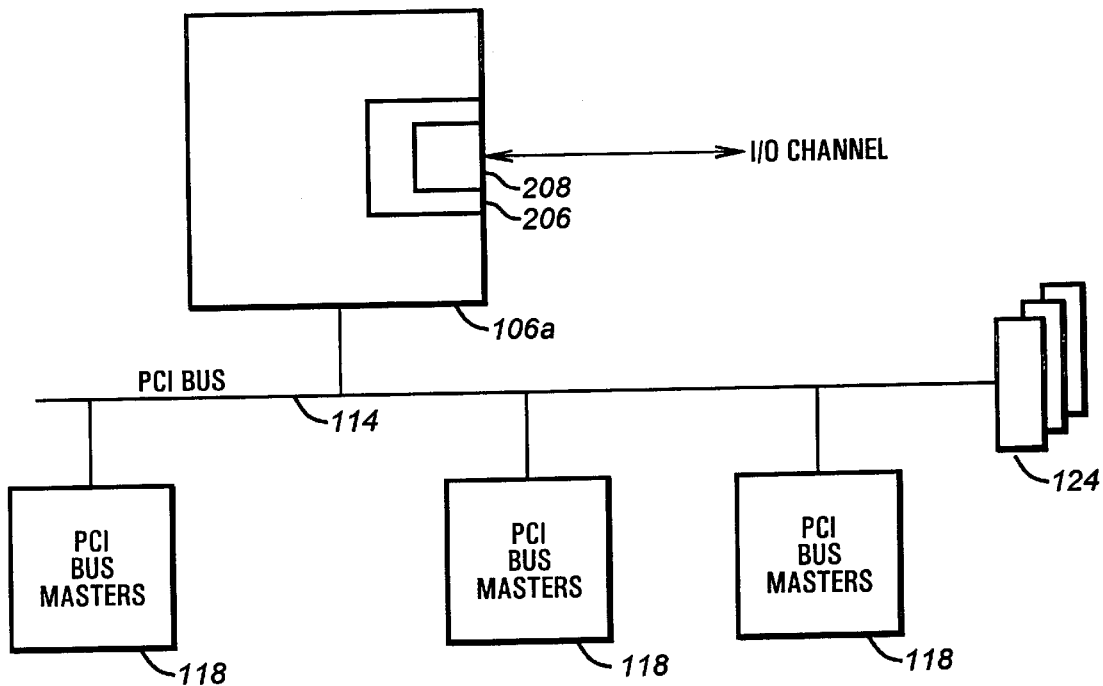
FIG. 6B is a block diagram illustrating a second embodiment of the DBE device in the host/pci bridge of FIG. 1.

Referring now to FIGS. 6A and 6B, there are illustrated at least two alternative locations for the distributed burst engine (DBE) 206. In FIG. 6A, a number of PCI bus masters 118 include the DBE interface 206 for efficiently bursting packets between the PCI bus master 118 and memory 112. In FIG. 6B, a host-to-PCI bridge 106a includes a DBE 206 for passing packet addresses between an I/O device 208, such as a Universal Serial Bus host controller or a Firewire controller, and memory 112.

Figure 6C:
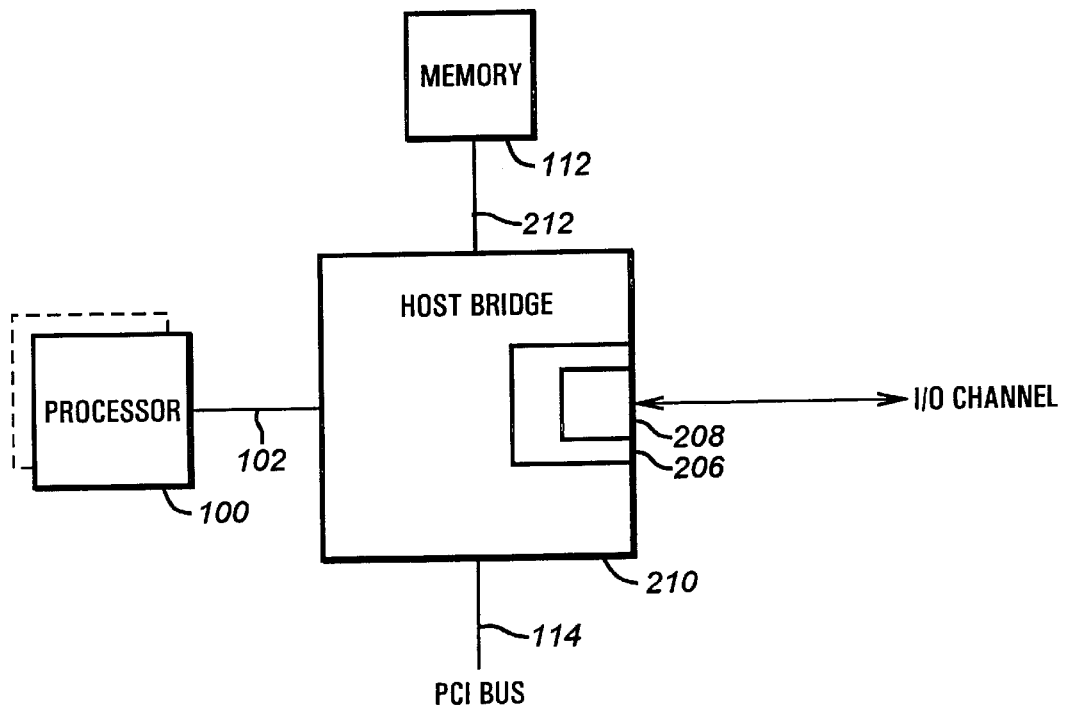
FIG. 6C is a block diagram illustrating a third embodiment of the DBE device in a bridge/memory controller device.

As a further variation of FIG. 6B, FIG. 6C illustrates a computer system where a host bridge 210 is attached to a host bus 102 for communicating with one or more processors 100; a memory bus 212 for communicating with memory 112; and a PCI bus 114 for communicating with peripherals. Reference is directed to patent application Ser. No. 08/940,914, entitled MULTIMEDIA COMPUTER ARCHITECTURE, filed on Nov. 30, 1997 and hereby incorporated by reference for further details of this architecture. In the host bridge 210 is an I/O channel 208, such as a Universal Serial Bus (USB), I.E.E.E. (Institute of Electrical and Electronic Engineers) 1394, a.k.a. Firewire, or Small Computer System Interrface (SCSI). The I/O channel 208 is connected to a distributed burst engine 206. This embodiment differs from the embodiments of FIGS. 6A and 6B because the DBE 206 is more tightly coupled to memory 112. This allows the DBE to pass packet addresses to the I/O device 208 instead of the DBE bursting the packets for the I/O device 208. In this way, the I/O device 208 can operate on the packets directly from memory 112. This has an advantage over the more loosely coupled DBE's of FIGS. 6A and 6B since the latency associated with bursting the packets over the PCI bus 114 is eliminated. Thus, the DBE device 206 is very adaptable to a variety of situations.

Distributed Burst Engine (DBE)

Figure 7:
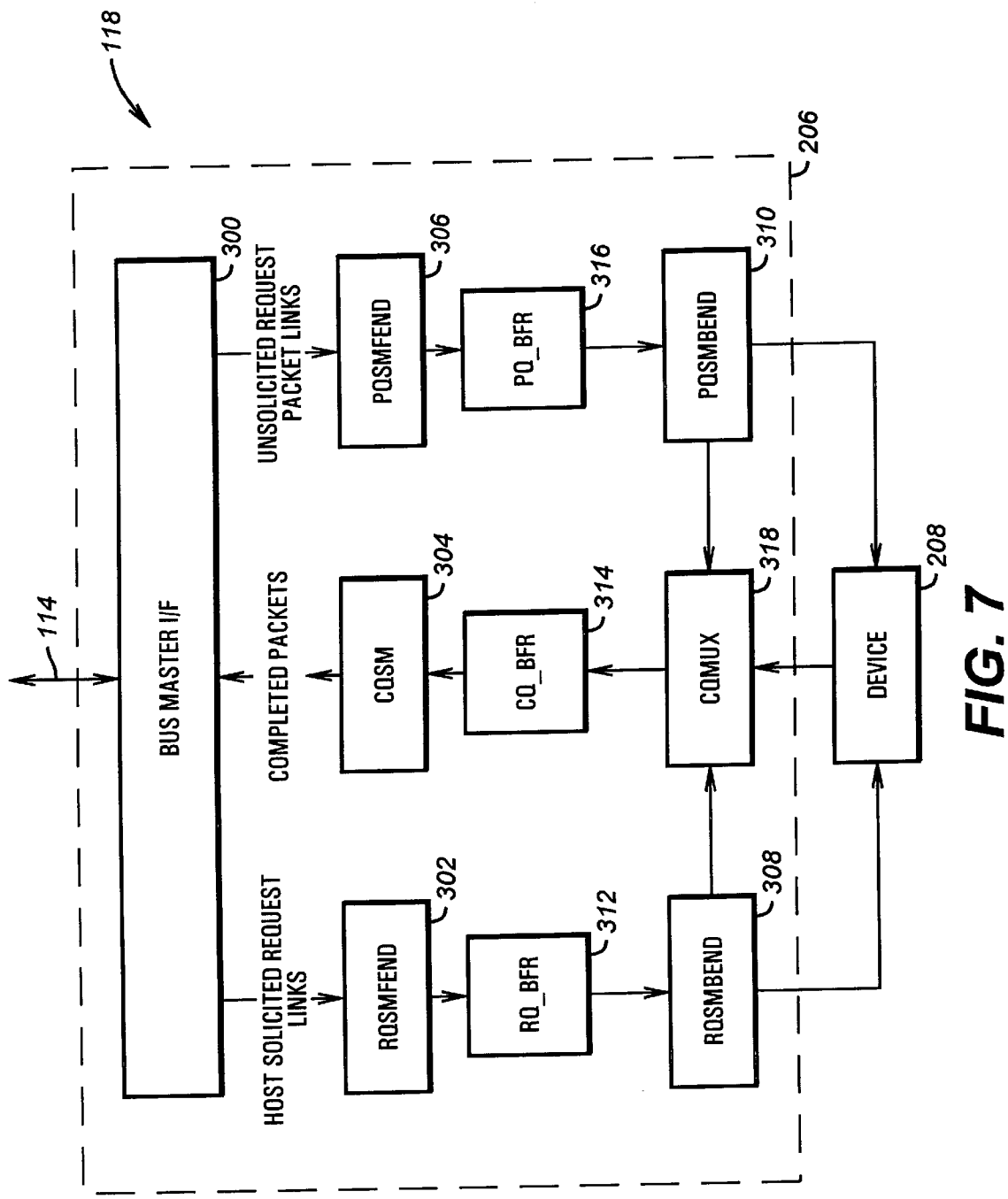
FIG. 7 is a block diagram illustrating further details of the DBE device according to the preferred embodiment.

Referring now to FIG. 7, there is illustrated a block diagram of the PCI bus master 118 including the DBE device 206 and I/O device 208. The DBE device 206 includes a bus master interface (I/F) 300 for exchanging data packets 250 over the PCI bus 114 between the DBE device 206 and memory 112. Alternatively, the DBE device 206 could have a bus master interface for an EISA bus or any other desired bus. The DBE device 206 also includes three buffers 312–316 coupled between certain front end state machines 302–306 and certain back end state machines 308–310. The three buffers are a request queue buffer (RQ$_n$_BFR) 312, a completion queue buffer (CQ_BFR) 314 and a posted queue buffer (PQ_BFR) 316. The front end's objective is to keep the request queue buffer 312 and posted queue buffer 316 full, and the completion queue buffer 314 empty. The back end's objective is to pull the packet address and data information from the request queue buffer 312 and posted queue buffer 316, process the packet, and complete the packet back to the processor 100.

The request queue buffer 312 is a first-in-first-out (FIFO) buffer for queuing solicited requests. The request queue buffer 312 is comprised of n number of buffers in parallel according to the number of channels 214 supported by the I/O device 208. Preferably the request queue front end state machine 302 and request queue back end state machine 308 are responsible for managing all of the request queue buffers 312, however, it is contemplated that separate sets of state machines could be used for each request queue buffer 312. For simplicity, the request queue buffer 312 is treated herein as a single buffer.

The completion queue buffer 314 is a FIFO for queuing completed packets. The posted queue buffer 316 is a FIFO for queuing unsolicited requests. The buffers 312–316 are considered to be a subset of their respective queues 274–278 since the buffers 312–316 may only contain a portion of an entire queue's data (queues 274–278). The buffers 312–316 decouple the I/O device 208 from the PCI bus 114 latencies which typically occur as a result of bus arbitration. This results in a higher performance I/O than obtainable before.

It is noted here that the DBE device 206 illustrated is a single stream DBE device. If the DBE device 206 is required to service a multifunction peripheral, multiple sets of state machines can be implemented in parallel to provide service for each function combined within the single I/O device. A single set of state machines handles all channels 214 for a corresponding I/O device 208.

The front end state machines include a request queue front end state machine (RQSMFEND) 302, a posted queue front end state machine (PQSMFEND) 306 and a completion queue front end state machine (CQSM) 304. The request queue front end state machine 302 is responsible for processing packets 250 placed on the request queue 274 by the device driver 230 and feeding the request queue buffer 312. The posted queue front end state machine 306 is responsible for pulling posted packet addresses from memory 112 and placing them in the posted queue buffer 316.

The back end state machines 308–310 include a request queue back end state machine (RQSMBEND) 308 and a posted queue back end state machine (PQSMBEND) 310. The request queue back end state machine 308 is responsible for pulling packet information from the request queue buffer 312 and feeding it to the I/O device 208. The posted queue back end state machine 310 is responsible for pulling unsolicited packet addresses from the posted queue buffer 316 and presenting them to the I/O device 208.

The completion queue state machine (CQSM) 304 cooperates with the front end and back end to complete packets and is responsible for maintaining the completion queue 276 and free queue 272 links. Also included in the DBE device 206 is a completion queue multiplexor (CQMUX) 318 for directing the flow of data into the completion queue buffer 314 from multiple sources: the I/O device 208, the requet queue back end state maching 308 and the posted queue back end state machine 310. The completion queue multiplexor 318 is controlled by the posted queue back end state machine 310.

Figure 8A:
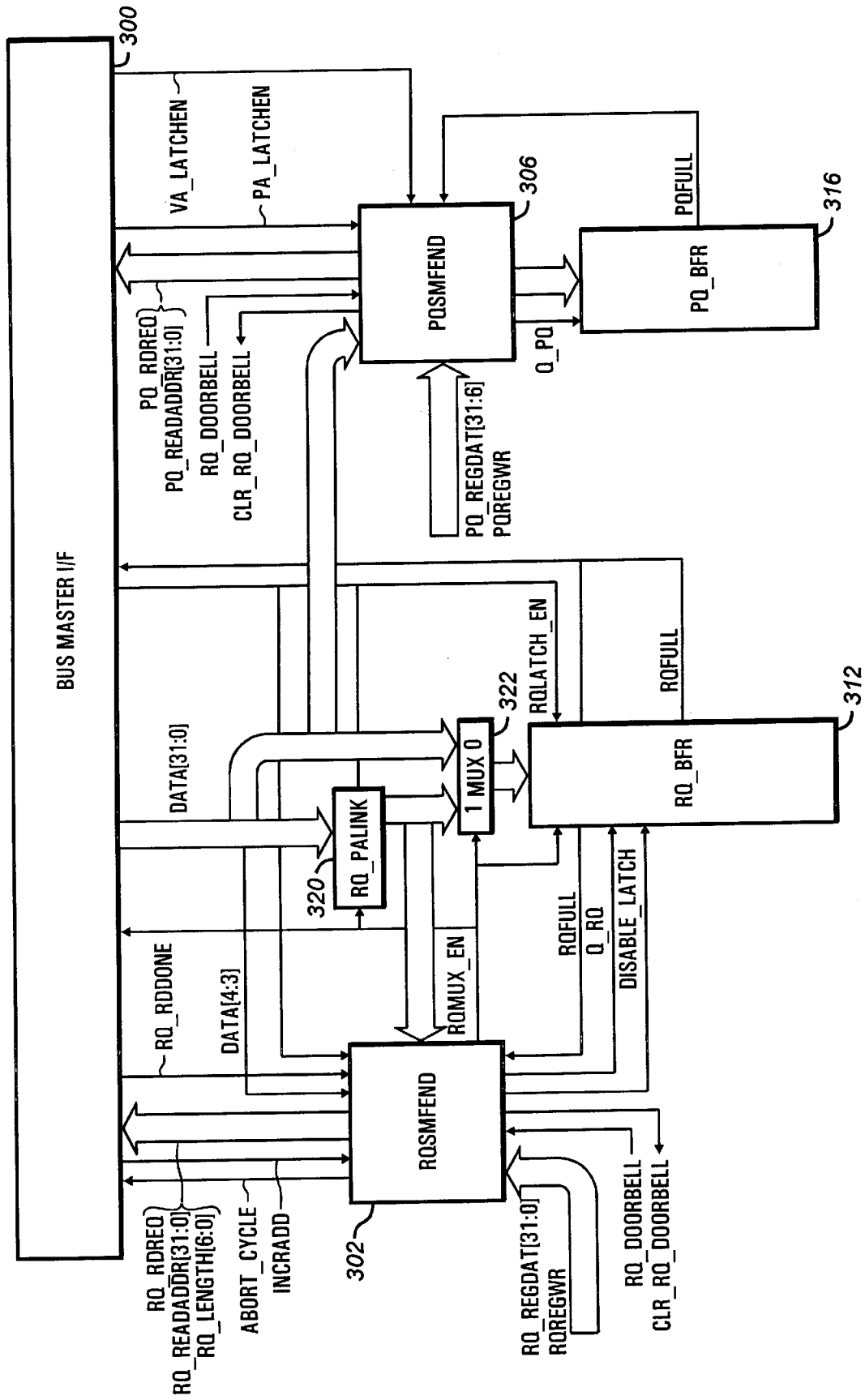
Figures 8B, 8C:
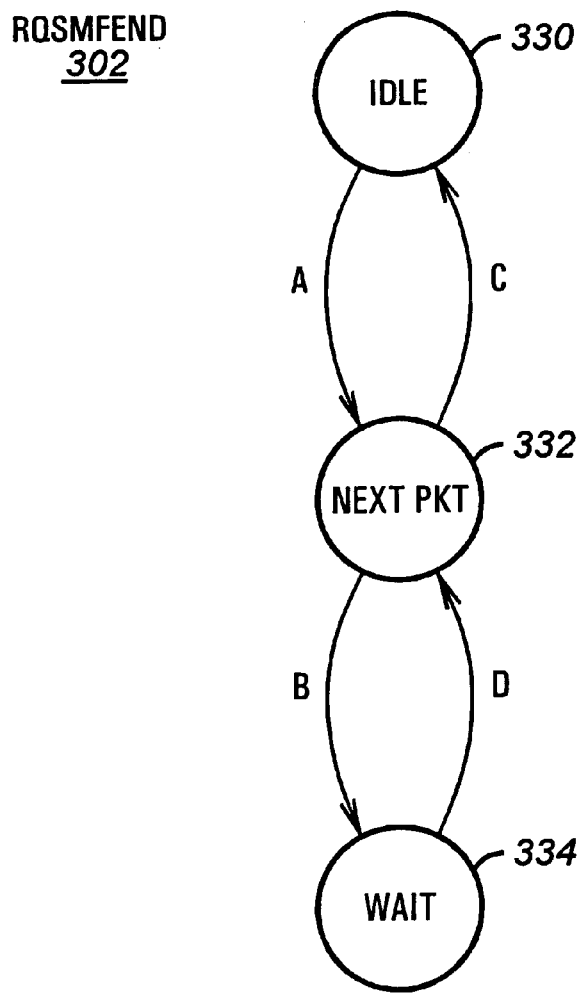

Now referring to FIG. 8A, there is illustrated a more detailed block diagram of the request queue front end state machine 302 and posted queue front end state machine 306 front ends. The request queue front end state machine 302 will be explained first. FIGS. 8B, 8C and 8D illustrate flow diagrams, state transition conditions and outputs for the request queue front end state machine 302. The outputs of the request queue front end state machine 302 are illustrated in FIG. 8D. Unless otherwise indicated, the outputs remain unchanged from their assigned logic level.

The request queue front end state machine 302 is responsible for processing packets placed on the request queue 274 by the processor 100. The request queue front end state machine 302 uses the Rq$_n$_REG 290 to obtain the memory address where the next packet address is placed by the processor 100. The processor 100 writes Rq$_n$_REG 290 once during system initialization and never writes to it again. The request queue front end state machine 302 maintains the contents of the Rq$_n$_REG 290 during runtime with the physical address of the last packet the request queue front end state machine 302 processed. The request queue front end state machine 302 attempts to keep the request queue buffer 312 full to decouple the request queue back end state machine 308 from the bus master I/F 300.

The request queue front end state machine 302 controls a request queue PA_LINK register (RQ_PALINK) 320 for holding the PA_LINK field 268. Internal to the request queue front end state machine 302 is the request queue head register (RQ_REG) 290; a packet length register (RQ_LENGTH) for holding the PaLinkDWORD field of a current packet; and a next packet length register (RQ_NXPLENGTH) for holding the PaLinkDWORD field of a next packet. The output of the RQ_LENGTH register is provided to the bus master I/F 300 so that it can properly read in a packet 250. While the following discussion only refers to a single channel request queue, it is understood that there are multiple channels available.

It is important to recall that packets 250 are linked together. Therefore, to clarify which packet 250 in the linked list the state machines are processing the following convention is used. A "current packet" refers to a packet currently being processed or transferred. A "previous packet" refers to a packet linked ahead of the current packet and processed before the current packet. A "next packet" refers to a packet linked behind the current packet and processed after the current packet. Thus, the PaLink field 268 of a previous packet points to the current packet and the PaLinkDWORD field 266 of a current packet indicates the number of DWORDs for the next packet. This is consistent for all packet types.

The request queue front end state machine 302 initializes to an IDLE state 330 from system reset. While in RESET mode, the device driver 230 initializes the RQ_REG 290 with the physical address of the last packet 250 on the solicited packet pool 200 (or free queue 272). The free queue 272 is required to maintain at least one free packet 250 on the solicited packet pool 200 for the DBE device 206 to have a place to queue completed asynchronous packets.

In the IDLE state 330, the request queue front end state machine 302 waits for the RQ_DOORBELL to be rung. While waiting for RQ_DOORBELL, the request queue front end state machine 302 initializes a request queue read address register (RQ_READADDR_B) with the value from the RQ_REG 290 (usually the physical address of the last request packet processed by the DBE) and the RQ_LENGTH register is initialized to 2h. If the DBE 206 has just been initialized by the device driver 230, the RQ_READADDR_B is initialized with the value written in the RQ_REG 290 by the device driver 230. If the RQ_DOORBELL signal is asserted, the request queue front end state machine 302 asserts a clear request queue doorbell (CLR_RQ_DOORBELL) signal and transitions to a NEXTPKT state 332.

In the NEXTPKT state 332, the RQ_DOORBELL is cleared and the packet 250 is read from memory 112 and written into the request queue buffer 312. The bus master I/F 300 begins providing packet information with the PaLinkDWORD field 266 and continues until the end of the payload is reached. The fields (see FIG. 3) before the PaLinkDWORD field 266 are not required by the request queue front end state machine 302.

As the current packet 250 is written, values from the previous packet are pushed onto the request queue buffer 312. The PaLinkDWORD field value 266 currently held in the RQ_LENGTH register is pushed onto the request queue buffer 312 as the PaLinkDWORD field value 266 of the current packet is latched into the RQ_NXPLENGTH register. A multiplexor (MUX) 322 is switched from the 0 input to the 1 input so that the PaLink field value 268 currently held in the RQ_PALINK register 320 is pushed onto the request queue buffer 312 as the PaLink field value 268 of the current packet is latched into the RQ_PALINK register 320. Afterwards, the multiplexor 322 is switched back to receive data from the zero input.

The Va+Flags field value 270 of the current packet is pushed onto the request queue buffer 312 as is the remaining payload 254 of the current packet. As the current packet 250 is written into the request queue buffer 312, the Va+Flags field 270 is checked for I/O cancellation or direct access. If either bit 3 or 4 of the Va+Flags field 270 is set, the packet transfer cycle is aborted before the payload is retrieved. As each DWORD of the packet 250 is read, the RQ_READADDR_B register is incremented accordingly.

When the payload 254 has been transferred, an RQ_RDDONE signal is received from the bus master I/F 300. If the RQ_RDDONE signal is received and the RQ_PALINK register contains a zero value, the request queue front end state machine returns to the IDLE state 330 and waits for another RQ_DOORBELL.

If the RQ_RDDONE signal is received and the RQ_PALINK register does not contain a zero value, another packet transfer cycle is needed. In this case, the state machine 302 increments the next packet length value in the RQ_NXPLENGTH by 3h and latches the value into the RQ_LENGTH register; and latches the value from the RQ_PALINK register into the RQ_READADDR_B register.

If the RQ_RDDONE signal is received, the RQ_PALINK register is not zero, but the request queue buffer 312 is fill (RQFULL), then the request queue front end state machine 302 transitions to a WAIT state. The state machine 302 transitions from the WAIT state back to the NEXTPKT state when the request queue buffer 312 is not full. The RQFULL signal is provided by the request queue buffer 312. In either state, if the request queue buffer 312 is not full, the value stored in the RQ_PALINK register is latched into the RQ_REG. After the RQ_LENGTH, RQ_READADDR_B and RQ_REG registers have been loaded, another packet transfer cycle begins.

Now referring to FIGS. 8A, 8E, 8F and 8G, there is illustrated a more detailed block diagram of the posted queue front end state machine 306. FIGS. 8E and 8F illustrate flow diagrams and state transition conditions for the posted queue front end state machine 306. The outputs of the posted queue front end state machine 306 are illustrated in FIG. 8G. Unless otherwise indicated, the outputs remain unchanged.

The posted queue front end state machine (PQSMFEND) 306 is responsible for pulling posted packet addresses from memory 112 and placing them in the posted queue buffer 316. The posted queue front end state machine 306 always requests three DWORDs (PALINKDWORDS, PA_LINK and VA+FLAGS for the current packet 250) on initial reads and two DWORDs (PA_LINK and VA+FLAGS) on all subsequent reads. The processor 100 builds a list of posted packets 250 during system initialization and then writes the PQ_REG 288 with the physical address of the first packet 250 in the posted queue 278. The posted queue front end state machine 306 traverses the list of posted packets 250 to prefetch the packet addresses. The addresses (PA_LINK and VA) are placed into the posted queue buffer 316 until the buffer 316 is full or there are no more posted packets 250 on the unsolicited packet pool 202 in memory 112. The unsolicited packet pool 202 is considered empty when there is only one packet 250 remaining on the list.

The posted queue front end state machine 306 contains the posted queue register (PQ_REG) 288; and other registers to hold the PA_LINK and length of the next packet's payload (PQ_PALINK and PQ_LENGTH).

The posted queue front end state machine 306 initializes to a REALIDLE state 336 from a system reset. While in RESET mode, the device driver 230 initializes the PQ_REG 288 with the physical address of the first packet in the unsolicited packet pool 202. Thereafter, the posted queue front end state machine maintains the PQ_REG 288 with the physical address of the head of the unsolicited packet pool 202.

In the REALIDLE state 336, the posted queue front end state machine 306 waits for the PQ_DOORBELL to be rung. The device driver 230 rings the PQ_DOORBELL when a packet 250 has been made available to the DBE device 206. This occurs everytime DBE_FreePacket or DBE_GetNextPacketToComplete is called with an unsolicited packet. If the PQ_DOORBELL bit is set, the posted queue front end state machine 306 transitions to an IDLE state 338.

In the IDLE state 338, the PQ_DOORBELL is cleared and a posted queue read request signal (PQ_RDREQ) is asserted. The posted queue front end state machine 306 automatically transitions from the IDLE state 338 to a GETPAVA state 340.

On a first read cycle in the GETPAVA state 340, the PA_LINK field value 268 is latched into a posted queue PaLink register (PQ_PALINK); the PaLinkDWORD field value 266 is latched into a posted queue length register (PQ_LENGTH); and the Va+Flags field value 270 is latched. Subsequent read cycles only read the PA_LINK and Va+FLAGS field since the payload 254 size is already known. For each read cycle the PA_LINK and VA+FLAGS fields are pushed onto the posted queue buffer 316. If the PA_LINK field for the current packet 250 is equal to zero, then the posted queue front end state machine 306 transitions back to the REALIDLE state to wait for the PQ_DOORBELL bit to be set again.

If the PA_LINK field for the current packet 250 is not equal to zero, then there is additional packets 250 linked to the current packet. In this case, the posted queue front end state machine 306 transitions to a QVA state 342 and back to the IDLE state 338 to fetch the next packet 250. Packet fetching is throttled if the posted queue buffer 316 fills up (PQFULL signal).

Figure 9A:
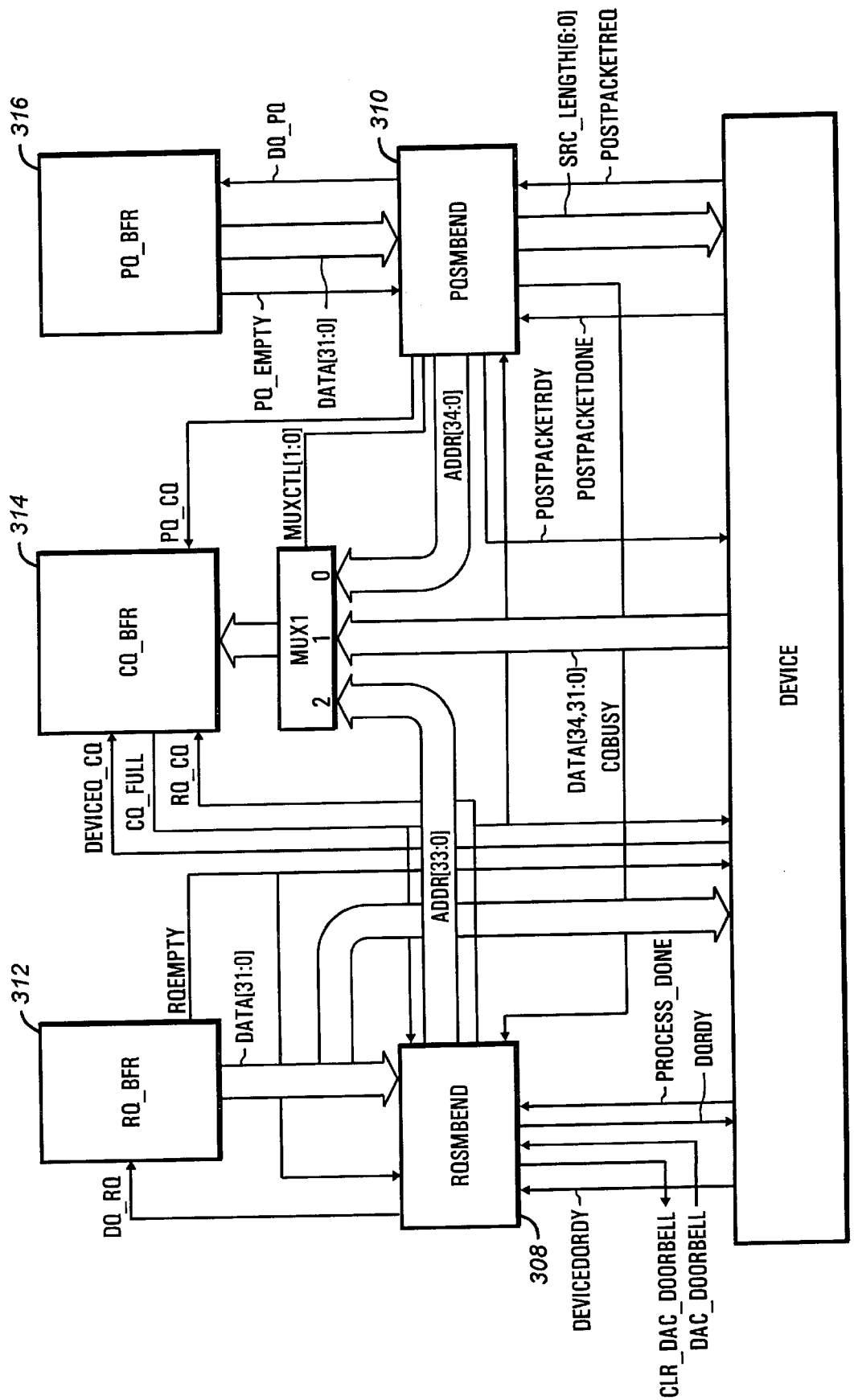
Figure 9B:
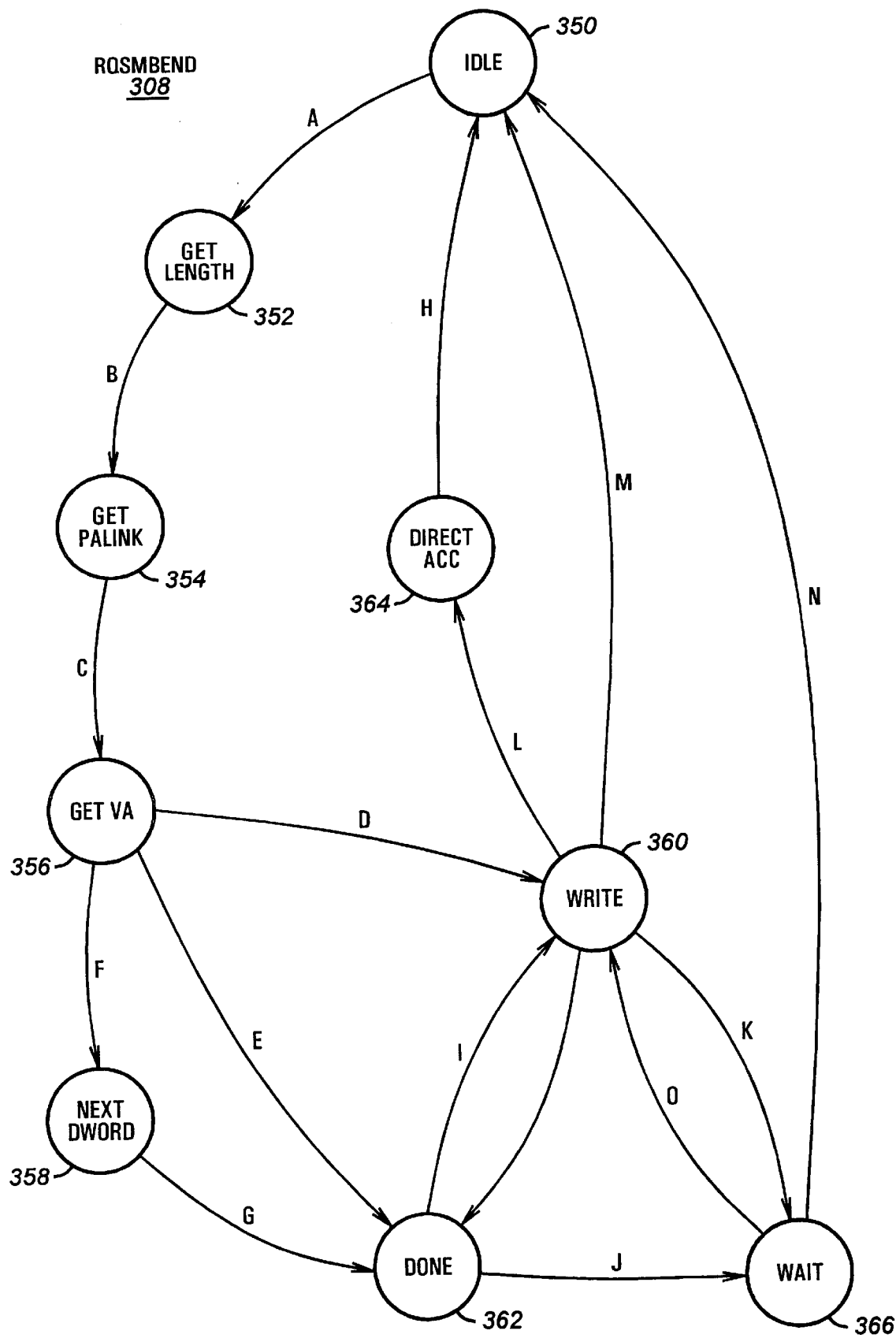

Now referring to FIG. 9A, there is illustrated a more detailed block diagram of the request queue back end state machine (RQSMBEND) 308 and the posted queue back end state machine (PQSMBEND) 310. The request queue back end state machine 308 will be described first. FIGS. 9B and 9C illustrate flow diagrams and state transition conditions for the request queue back end state machine 308. The outputs of the request queue back end state machine 308 are illustrated in FIG. 9D. Unless otherwise indicated, the outputs remain unchanged from their previously assigned logic level.

The request queue back end state machine 308 is responsible for pulling packet information from one of the request queue buffers 312. The request queue back end state machine 308 pulls the physical and virtual addresses from the request queue buffer 312 and lets the I/O device 208 pull the data 254. When a packet 250 has been processed by the I/O device 208, the I/O device 208 notifies the request queue back end state machine 308 to complete the packet 250. The packet 250 is marked as an interrupt, polled or asynchronous completion. The request queue back end state machine 308 is also responsible for synchronizing processor 100 direct access to the DBE device 206 with packets 250 pending completion.

The request queue back end state machine 308 initializes to an IDLE state 350 from system reset or RESET mode where it waits for an !RQEMPTY signal from the request queue buffer 312 to indicate that the request queue buffer 312 is not empty. When not empty, the request queue back end state machine 308 transitions to a GETLENGTH state 352 and asserts a request queue (dq_RQ) signal to pop the first DWORD off the request queue buffer 312.

In the GETLENGTH state 352, the state machine 308 writes the first DWORD into a length register (RQB_LENGTH). The first DWORD is the PALINKDWORD field value 266 of the current packet 250. If the request queue buffer 312 is not empty, the request queue back end state machine 308 transitions to a GETPALINK state 354 and asserts the request queue (dq_RQ) signal to pop another DWORD off the request queue buffer 312. If the request queue buffer 312 is empty, the request queue back end state machine 308 remains in the GETLENGTH state 352 until the request queue buffer 312 is not empty.

In the GETPALINK state 354, the state machine 308 writes the second DWORD into a request queue PA_LINK register (RQB_PALINK). The second DWORD is the PA_LINK field value 268 of the current packet 250. If the request queue buffer 312 is still not empty, the request queue back end state machine 308 transitions to a GETVA state 356 and asserts the request queue (dq_RQ) signal to pop another DWORD off the request queue buffer 312. If the request queue buffer 312 is empty, the request queue back end state machine 308 remains in the GETPALINK state 354.

In the GETVA state 356, the state machine 308 writes the third DWORD into a request queue VA+FLAGS register (RQB_VA+FLAGS). The third DWORD is the VA+FLAGS field value 270 of the current packet 250. While the VA+FLAGS field value 270 is written, the state machine 308 checks bit 4 for I/O cancellation and bit 3 for direct access. Bit 3 is qualified so that it is only checked if RQB_LENGTH=0. If either bit is set, the state machine 308 transitions to a WRITE state 360 (discussed below) and the packet is not submitted to the I/O device 208. If bits 3 and 4 are not set, but the RQB_LENGTH=0, the state machine 308 transitions to a DONE state 362 (discussed below). Otherwise, the state machine 308 transitions to a NEXTDWORD state 358 and asserts a DQRDY signal to indicate to the I/O device 208 that data is ready.

In the NEXTDWORD state 358, the DQ_RQ signal is asserted to pop DWORDS off the request queue buffer 312. Each time a DWORD is read in by the I/O device 208, a device ready (DEVICEDQRDY) signal is received from the I/O device 208 and the LENGTH register is decremented by one. When the LENGTH value reaches 1h, the DQRDY signal is deasserted and the state machine 308 transitions to the DONE state 362.

In the DONE state 362, the state machine 308 determines what type of packet was completed: asynchronous, interrupt or polled. The DQ_RQ signal is deasserted to stop dequeueing packet information. To determine packet type the state machine 308 examines bits 1 and 2 of the VALINK field value 270 stored in the RQB_VALINK register. If bits 2:1=1h (DBE_PKT_SUBMIT_A), the state machine 308 transitions to the WRITE state 360. If bits 2:1=2h(DBE_PKT_SUBMIT_P) or 2:1=3h(DBE_PKT_SUBMIT_I), the state machine 308 transitions to the WAIT state 366 and asserts a DONE signal to the I/O device 208 to request acknowledgement that the packet 250 has been processed.

In the WAIT state 360, the state machine 308 waits for completion notification from the I/O device 208. If a PROCESS_DONE signal is received from the I/O device 208 and the packet was an asynchronous packet, the DONE signal is deasserted and the state machine 308 transitions back to the IDLE state 350. If the PROCESS_DONE signal is received from the I/O device 208 and the packet was not an asynchronous packet, the DONE signal is deasserted and the state machine 308 transitions to the WRITE state 360. If the PROCESS_DONE signal is not received, the state machine waits in the WAIT state 308.

In the WRITE state 360, the PA_LINK 268 and VA+FLAGS 270 field values of the current packet 250 are written to the completion queue 276. The type of packet is also marked on the queue so the front end understands the type of packet it is about to process.

The state machine 308 makes two passes through the WRITE state 360 based on an AGAIN signal if the completion queue 276 is not full (CQFULL) and not busy (CQBUSY) with the posted queue back end state machine 310. Otherwise the state machine 308 waits until the completetion queue 276 is not full and available. AGAIN is set the first time through, so that AGAIN is not set on the first pass and set on the second pass.

On the first pass, the physical address (PA) for the current packet is written into the completion queue 276. The second pass depends upon the packet type.

If the packet type is asynchronous, then the virtual address for the current packet 250 is written into the completion queue 276 with bits 33:34 written with "2h" to signify an asynchronous packet. The state machine 308 transitions to the WAIT state 366 if the packet 250 was marked for I/O cancellation or not marked for direct access. Otherwise (packet 250 was not marked for I/O cancellation but was marked for direct access), the state machine 308 transitions to a DIRECTACC state 364 and clears the direct access bit in the corresponding request register ($Rq_n$_REG) which indicates to the device driver 230 that the channel is available or synchronized.

If the packet type is polled, the virtual address for the current packet 250 is written into the completion queue 276 with bits 33:34 written with "1h" to signify a polled packet. The state machine 308 transitions to the IDLE state 350 if the packet 250 was marked for I/O cancellation or not marked for direct access. Otherwise (packet 250 was not marked for I/O cancellation but was marked for direct access), the state machine 308 transitions to a DIRECTACC state 364 and clears the direct access bit in the corresponding request register ($Rq_n$_REG) which indicates to the device driver 230 that the channel is available or synchronized.

If the packet type is interrupt, the virtual address for the current packet 250 is written into the completion queue 276 with bits 33:34 written with "3h" to signify a interrupt packet. The state machine 308 transitions to the IDLE state 350 if the packet 250 was marked for I/O cancellation. If the packet 250 was marked for direct access, the state machine 308 transitions to the DIRECTACC state 350 and clears the direct access bit in the corresponding request register ($Rq_n$_REG) which indicates to the device driver 230 that the channel is available or synchronized. Otherwise, the state machine 308 transitions to the WAIT state 350.

In the DIRECTACC state 364, the state machine 308 waits for the device driver 230 to complete the direct access operation. The state machine 308 does not pull any additional data from the request queue buffer 312 until the device driver 230 sets the end direct access bit (bit 3) in the request register (Rqn_REG).

Now referring to FIGS. 9A, 9E and 9F, there is illustrated a more detailed block diagram of the posted queue back end state machine (PQSMBEND) 310 and corresponding flow diagrams and state transition conditions for the posted queue back end state machine 310. The outputs of the posted queue back end state machine 310 are illustrated in FIG. 9G. Unless otherwise indicated, the outputs remain unchanged from their previously assigned logic level.

The posted queue back end state machine 310 is responsible for pulling unsolicited packets addresses from the posted queue buffer 316 and presenting them to the I/O device 208. The I/O device 208 uses these addresses as locations in memory 112 to "dump" unsolicited data. The posted queue back end state machine 310 always removes two DWORDs (PALINK and VA+FLAGS) from the posted queue buffer 316. Unsolicited data received by the DBE device 206 is written to memory 112 with the physical and virtual address provided by the posted queue front end state machine 306.

The posted queue back end state machine 316 writes the unsolicited packet's physical payload address into the completion queue buffer 314. The posted queue back end state machine 316 then requests the I/O device 208 to "dump" its unsolicited data into the completion queue buffer 314 for the length of the unsolicted packet's payload data area for the current packet 250. In turn, the I/O device 208 notifies the posted queue back end state machine 316 when it has completed "dumping" data. The posted queue back end state machine 316 then places the unsolicited packet's virtual and physical address header information into the completion queue buffer 314. The completion queue state machine 304 completes this packet as an interrupt type packet 250.

The posted queue back end state machine 310 initializes to an IDLE state 370 from system reset or RESET mode where it waits for a posted packet request (POSTPACKETREQ) signal from the I/O device 208. If the POSTPACKETREQ signal is asserted, the posted queue buffer 310 is not empty (PQEMPTY) and a multiplexor control signal (MU_XVA) is not asserted, a completion queue busy (CQBUSY) signal is set, the physical address of the current packet is removed from the posted queue buffer 310 and latched; the physical address of the payload is placed onto the completion queue; the multiplexor control signals are set ("1") to receive data from the I/O device 208, and the state machine 310 transitions to a GETVA state 372.

In the GETVA state 372, if the posted queue buffer 316 is not empty (PQEMPTY), the state machine notifies the I/O device 208 that a posted packet 250 is ready (POSTPACKETRDY) and to "dump" data into the completion queue buffer 314 and transitions to a WAIT state 374.

In the WAIT state 374, if a posted packet done (POSTPACKETDONE) signal is received from the I/O device 208, the multiplexor control signals are set ("0") back to receive the packet virtual address (VA+FLAGS) from the posted queue back end state machine 310. If the POST-PACKETDONE signal is recieved, the completion queue buffer 314 is not full and the POSTPACKETRDY signal is asserted, the state machine 310 deasserts the POSTPACK-ETRDY signal and pushes the physical address (PA_LINK) of the current packet onto the completion queue buffer 314. If the completion queue buffer 314 is not full and the POSTPACKETRDY signal is deasserted, the virtual address (VA+FLAGS) is then placed onto the completion queue 276

Figure 10A:
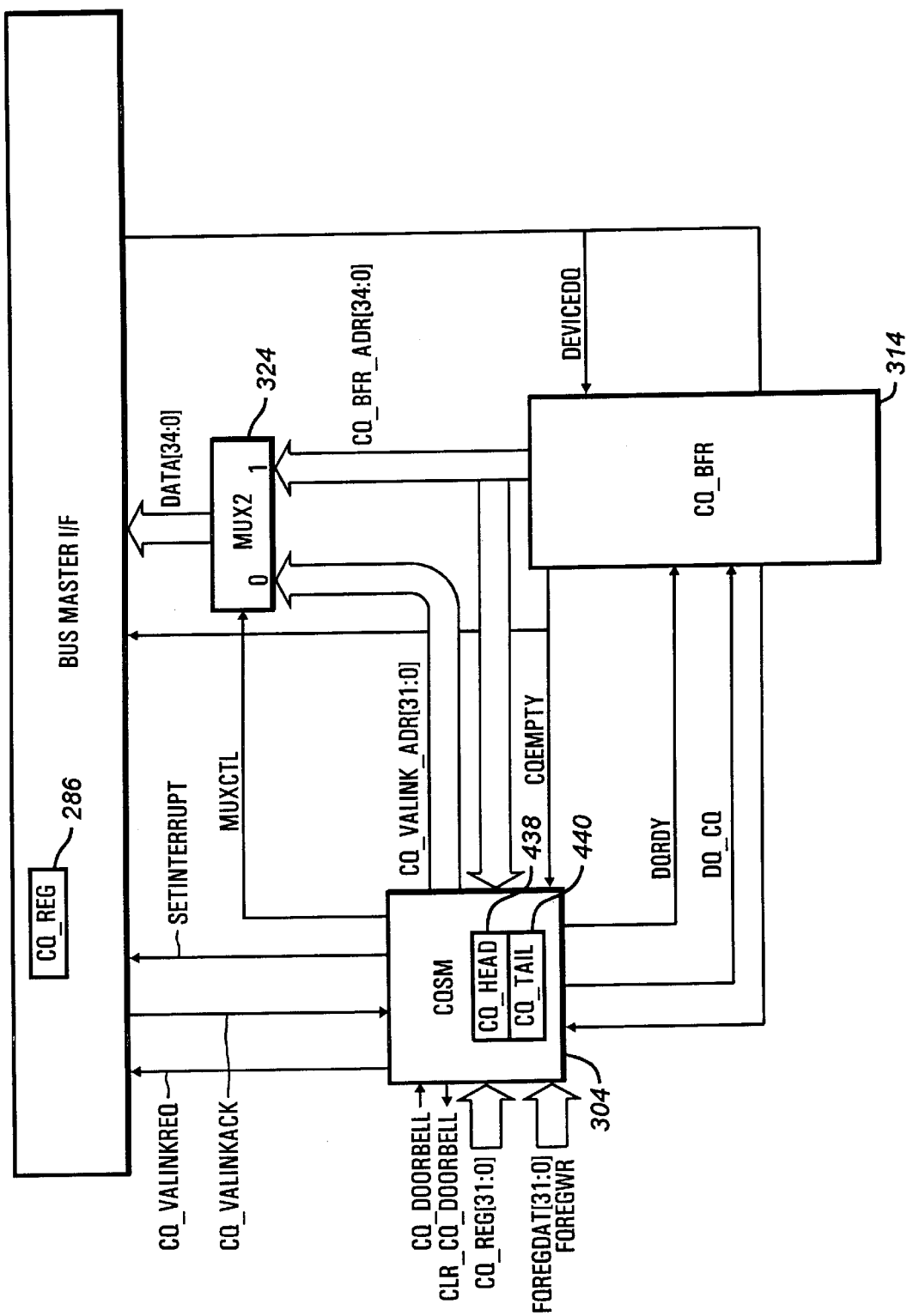
Figure 10B:
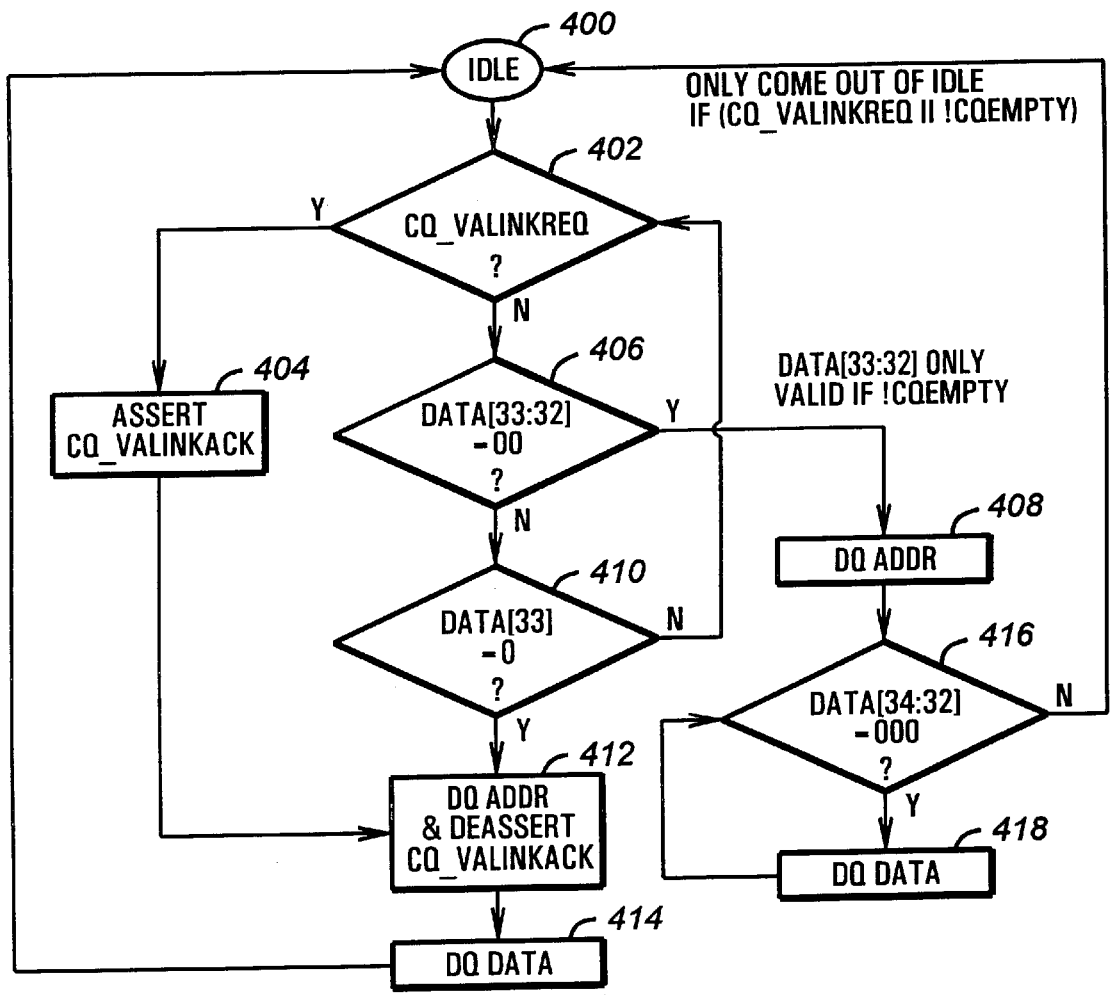

Now referring to FIGS. 10A–E, there is illustrated a more detailed view of the completion queue state machine 304. FIG. 10B is a flow diagram for control of the bus master I/F 300. The completion queue state machine 304 controls the flow of data through a multiplexor (MUX2) 324 as the bus master I/F 300 pulls addresses and data from the completion queue buffer 314.

Referring first to FIG. 10B, the bus master I/F 300 waits in an IDLE state 400. If at step 400 a completion queue VA link request (CQ_VALINKREQ) signal is received or the completion queue buffer 314 is not empty, the bus master I/F 300 transitions to a step 402 where the CQ_VALINKREQ signal is tested. If the CQ_VALINKREQ signal is asserted by the completion queue state machine 304, the bus master I/F proceeds to a step 404. If the CQ_VALINKREQ signal is not present, then the bus master I/F proceeds to a step 406 where bits 33:32 of the completion queue buffer 314 output are tested. If bits 33:32 are equal to zero, the bus master I/F 300 proceeds to a step 408. If bits 33:32 are not zero, the bus master I/F 300 proceeds to a step 410 where bit 33 is tested. If at step 410, bit 33 is not equal to zero, then the bus master I/F 300 returns to step 402. If at step 410, bit 33 is equal to zero, then the bus master I/F 300 proceeds to a step 412 to remove the packet address information. From step 412, the bus master I/F 300 proceeds to a step 414 where the packet data is removed from the completion queue buffer 314. From step 414, control proceeds back to the IDLE state 400.

At step 404, the bus master I/F 300 asserts a completion queue VA link acknowledge (CQ_VALINKACK) signal. From step 404, control proceeds to step 412 where the packet address information is removed and the CQ_VALINKACK signal is deasserted.

At step 408, the bus master I/F 300 removes packet address information. From step 408, control proceeds to step 416 where bits 34:32 of the removed packet address are tested. If bits 34:32 are equal to zero, then control proceeds to a step 418 where the packet data is removed from the completion queue buffer 314. Steps 416 and 418 are repeated until bits 34:32 are no longer equal to zero (packet data is removed). If at step 416 bits 34:32 are not equal to zero, then control proceeds back to the IDLE state 400.

The completion queue state machine (CQSM) 304 is responsible for maintaining the completion and free queue links. It is also responsible for presenting the completion link list to the CQ_REG 286 and notifying the bus master I/F 300 to set an interrupt upon the CQ-REG 286 write completing (posted and interrupt packets only). The completion queue state machine 304 receives completed packets from solicited and unsolicited events. Completion is required for interrupt packets issued to the request queue 274 and all packets originating from the unsolicited packet pool 202 that have been filled in by the I/O device 208 with unsolicited data.

The processor 100 rings the CQ_DOORBELL bit of the CQ_REG 286 when the completion queue has been serviced and the processor 100 is ready for another list of completed packets. If the completion queue 276 in memory 112 has not been serviced by the processor 100, the completion queue state machine 304 writes the virtual address of the current completed packet into the VA field 270 of the previously completed packet 250. The completion queue state machine 304 saves the physical address of the current packet 250 as the tail T for the next time a packet requires completion.

If the completion queue 276 in memory 112 is ready to accept a list of completed packets 250, the virtual address VA of the first packet 250 in the list of completed packets is written to the completion queue 276 in memory 112. The physical address of the head of the completion queue 276 is located in CQ_REG 286. Afterwards, the completion queue state machine's 304 internal head/tail registers are nulled to begin a new completion list.

The completion queue state machine 304 also completes packets 250 that were submitted as asynchronous requests by the driver. When the operation specified in the asynchronous packet 250 is finished, the completion queue state machine 304 places the virtual address VA of the packet 250 onto the tail T of the solicited packet pool 200. The tail T of the solicited packet pool 200 is maintained by the DBE device 206 through the FQ_REG 284. After the packet's virtual address VA is written to the previous packet's VALINK field 260, the completion queue state machine 304 places the packet's physical address PA into FQ_REG 284.

Figures 10C, 10D:
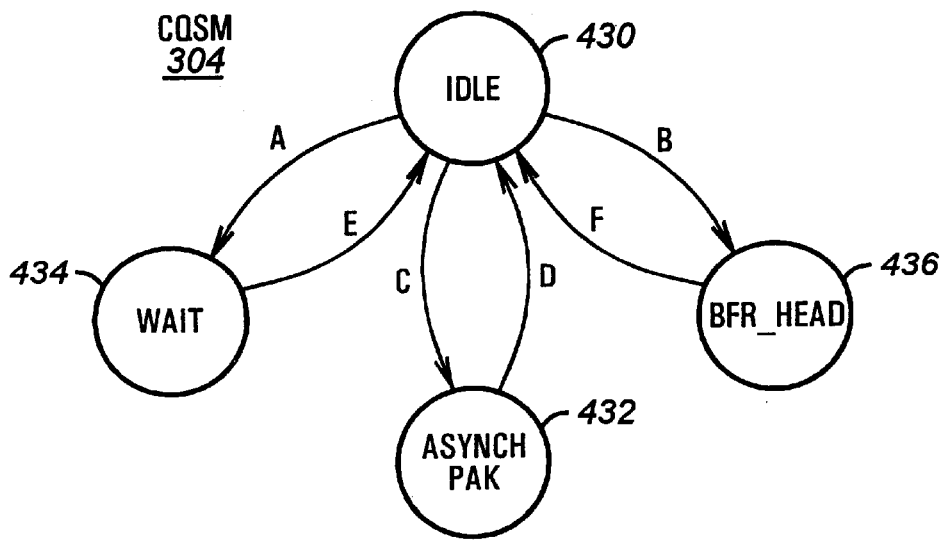

Referring now to FIGS. 10C–E, the operation of the completion queue state machine 304 will be described. The completion queue state machine 304 initializes to an IDLE state 430 upon system reset or RESET mode. The completion queue state machine 304 waits in the IDLE state until one of three events happens: 1) the completion queue doorbell (CQ_DOORBELL) is rung and the completion queue buffer 314 is not null; 2) a completed interrupt packet 20 needs to be linked to the tail T of the completion queue 276; or 3) a completed asynchronous packet needs to be linked to the tail T of the completion queue 276.

If the completion queue doorbell (CQ_DOORBELL) is rung and a completion queue head register (CQ_HEAD) 438 is not null, then the completion queue state machine 304 asserts the CQ_VALINKREQ signal and a set interrupt (SETINTERRUPT) signal to the bus master I/F 300 to see if the bus master I/F 300 is ready for an interrupt. The CQ_HEAD 438 is maintained by the state machine 304 to track a completion list. When the bus master I/F 300 responds with the CQ_VALINKACK signal, the state machine 304 causes the MUX2 to pass the physical address in CQ_REG and then the virtual address of the head of the completion list located in CQ_HEAD to the bus master I/F 300. The CQ_HEAD and the completion queue doorbell bit (CQ_DOORBELL) are then cleared and the state machine 304 transitions to a WAIT state 434.

If either the CQ_DOORBELL is not set or the CQ_HEAD is equal to zero, and if a ready signal (GO) from the bus master I/F 300 is set, the state machine 304 pulls the first DWORD off the completion queue 276 (physical address for the current packet) and writes it to a completion queue tail register CQ TAIL 440. This DWORD is the physical address of the last packet on the completion queue 276. Next, the state machine 304 transitions to a BFR_HEAD state 436.

In the BFR_HEAD state, the virtual address of the current packet is stored. If the completion queue head register 286 is not equal to zero and the CQ_DOORBELL is not set, the state machine 304 asserts the CQ_VALINKREQ signal to pass the physical address of the previous packet (CQ_TAIL) to the bus master I/F 300. When the bus master I/F 300 responds with the CQ_VALINKACK signal, the first DWORD from the completion queue buffer 314 is written into the CQ_TAIL register 440 and the state machine 304 transitions to an ASYNCHPAK state 432. (The virtual address of the current packet is written to the physical address of the previous packet (CQ_TAIL)).

If either the CQ_DOORBELL is not set or the CQ_HEAD is equal to zero, and if the ready signal (GO) from the bus master I/F 300 is set and bits 34:33 indicate that the current packet is an asynchronous packet, the state machine 304 asserts the CQ_VALINKREQ signal to pass the virtual address of the next packet to the bus master I/F 300. When the bus master I/F 300 responds with the CQ_VALINKACK signal, the contents of FQ_REG 284 are passed to the bus master I/F 300, the first DWORD from the completion queue buffer 314 is written into the FQ_REG 284, the virtual address from the completion queue buffer 314 is written to the previous contents of FQ_REG 284 and the state machine 314 transitions to the ASYNCHPAK state 432.

In the ASYNCHPAK state 432, the state machine 304 waits for the GO signal to be deasserted to transition back to the IDLE state 430. If a device de-queue (DEVICEDQ) signal is received and an AGAIN signal is not asserted, then the MUX2 is set to receive addresses from the completion queue buffer 314. The DEVICEDQ signal is provided by the bus master I/F 300 to pull data off the completion queue buffer 314. The AGAIN signal causes the state machine 304 to remain in the ASYNCHPAK state 432. The MUX2 essentially controls the switching between the completion queue buffer 314 and FQ_REG 284. When the GO signal is deasserted, the state machine 304 transitions back to the IDLE state 430.

In the WAIT state 434, the state machine 304 waits for confirmation that the interrupt was generated before returning to the IDLE state 430. If an INTROUTB signal is received from the bus master I/F 300, the CQ_HEAD is nulled and the state machine 304 returns to the IDLE state 430.

In the BFR_HEAD state 436, the virtual address of the current packet being completed is written to the VALINK field 260 of the previous packet completed.

DBE/Bridge

Figure 6D:
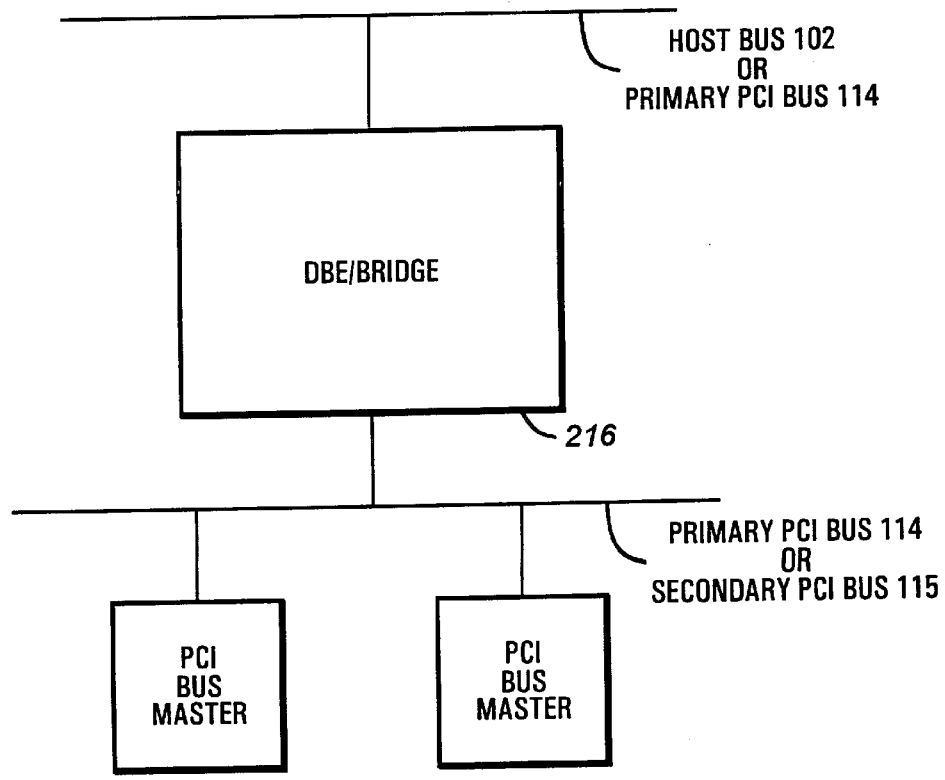
FIG. 6D is a block diagram illustrating a fourth embodiment of the DBE device in a pci/pci bridge.
Figure 11:
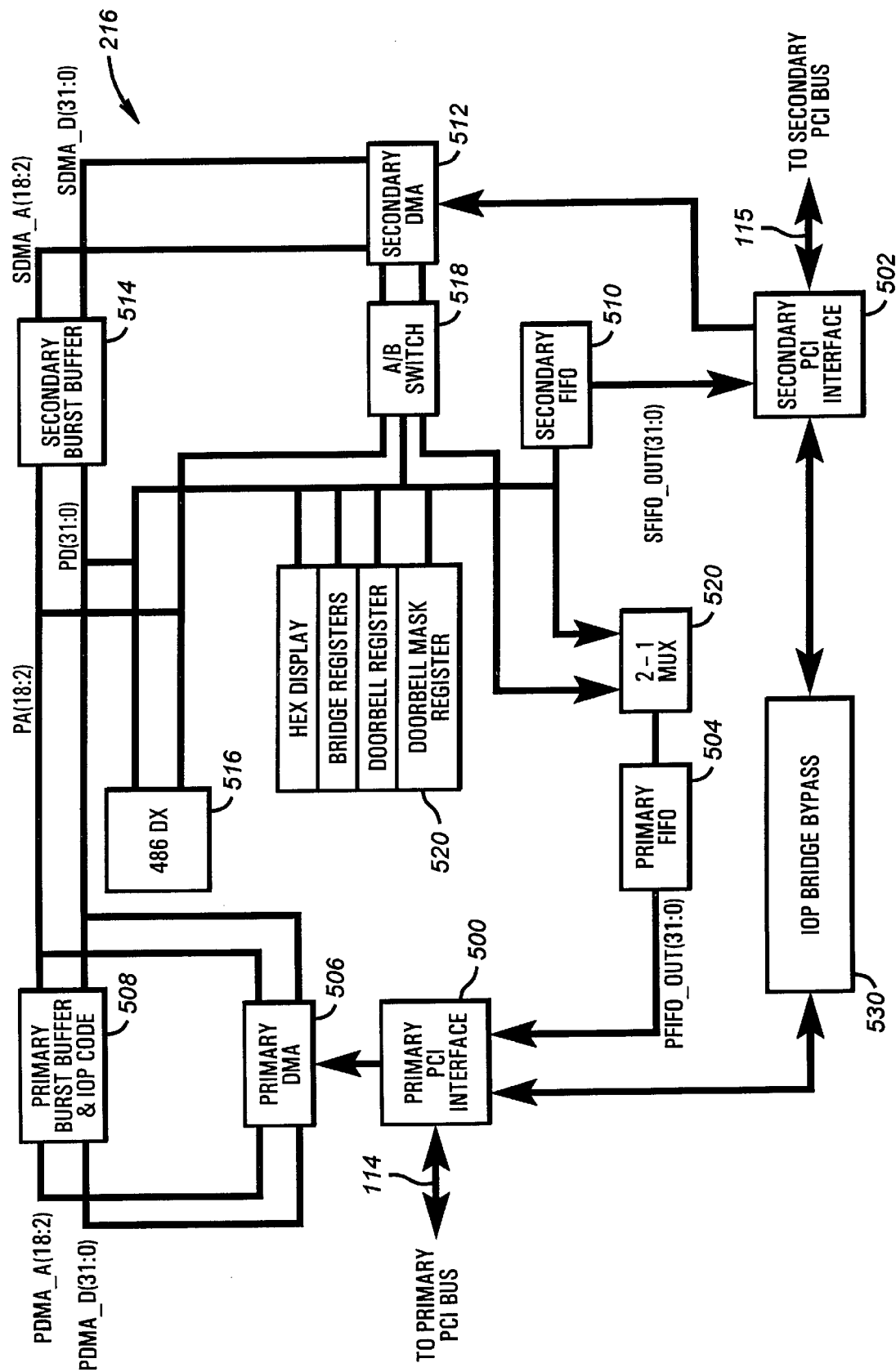
FIG. 11 is a block diagram illustratin an alternative embodiment of the DBE device.

Referring now to FIG. 11, there is illustrated a more detailed block diagram of the DBE/Bridge 216 of FIG. 6D. It is shown with a primary PCI bus I/F controller 500 and a secondary PCI bus I/F controller 502, although alternatively these interfaces could be adapted to other buses, including the host bus 102. Each PCI controller 500 and 502 contains a master and slave I/F. The same packet architecture and protocol described above applies to the hardware of FIG. 11, and therefore is not repeated here.

The DBE/Bridge 216 can be viewed in two functional halves: one half communicates with the primary PCI bus 114 and other other half communicates with the secondary PCI bus 115. The primary PCI bus half contains the primary PCI bus I/F controller 500, a primary FIFO 504, a primary direct memory access (DMA) controller 506 and a primary burst buffer (PBB) 508. The secondary PCI bus half contains the secondary PCI bus I/F controller 502, a secondary FIFO 510, a secondary DMA controller 512 and a secondary burst buffer (SBB) 514. The burst buffers 508 and 514 are preferably dual ported to allow both the I/O processor 516 and either a DMA engine (506 or 512) or PCI I/F (500 or 512) simultaneous access, thus removing any potential bottlenecks between the PCI devices 118, the I/O processor 516 and the processor 100. However, other types of memory, such as conventional DRAM or SRAM, could be used to form the burst buffers 508 and 514.

Also included in the DBE/Bridge 216 is an embedded I/O processor 516 which provides the intelligence necessary to transfer data without intervention from the processor 100. This effectively decouples the PCI devices 118 connected to the DBE/Bridge 216 from the processor 100 to maximize concurrency and balance loading between the processor 100, DBE/Bridge 216 and PCI devices 118. The I/O processor 516 is preferably an Advanced Micro Devices 486 processor, but any type of processor could be used. The data cache is disabled in the I/O processor 516. A memory controller could be included to ensure data cache coherency.

Part of the primary burst buffer 508 is allocated to storing code for the I/O processor 516. Alternatively, a separate read only memory (ROM) can be used to store code or configuration information. A memory controller is coupled to the I/O processor 516 to decode processor cycles into the following classifications: ROM read/write; Burst Buffer (local memory) hit; FIFO read/write; DMA controller configuration; Local register read/write; Hex status display write; PCI configuration; Other (PCI cycles). If a cycle does not fall within the local address space, the cycle is converted to a PCI cycle.

It is the responsibility of the I/O processor 516 when communicating with the different PCI devices 118 to encapsulate the variety of status and command formats into a packet 250 that the device driver 230 can understand.

To facilitate bursting at full PCI bus speeds, there is provided primary (PBB) and secondary (SBB) burst buffers 504 and 506 which are controlled by primary and secondary direct memory access (DMA) controllers 508 and 510 respectively. The primary DMA controller 508 is responsible for transferring data between the primary burst buffer 504 and the primary PCI bus 114. The secondary DMA controller 510 is responsible for transferring data between the secondary burst buffer 506 and the secondary PCI bus 115.

The primary and secondary FIFOs 504 and 510 are provided to transfer data in addition to and as a more efficient alternative to having the DMA controllers 506 and 512 perform the transfer. If data is transferred by one of the DMA controllers 506 or 512, both the primary and secondary PCI buses 114 and 115 will be utilized. For example, if the secondary DMA controller 512 was to transfer the data from the secondary burst buffer 514 to memory 112, the secondary PCI bus 115 would be unavailable as well as the primary PCI bus 114. Data is primarily received into the DBE/bridge 216 at the primary and secondary burst buffers 508 and 514. Therefore, rather than have the DMA controllers 506 and 512 move data out of the DBE/bridge 216 from the primary and secondary burst buffers 508 and 514, the DMA controllers 506 and 512 can move the data into the FIFOs 504 and 510. Thereafter, the data can be moved from one of the FIFOs 504 and 510 without impacting both PCI buses 114 and 115. For example, if the PCI device 118 writes data into the secondary burst buffer 514, the secondary DMA controller 512 can move the data into the primary FIFO 504. Once this is done, the data can be transferred from the primary PCI I/F 500 while the secondary PCI I/F 502 is receiving another block of data.

To facilitate this movement of data between the burst buffers 508 and 514 and the primary and secondary FIFOs, a switch 518 and a multiplexor 520 is provided to pass data and route data as shown in FIG. 11. Additionally, the DBE/bridge 216 includes a number of registers including a doorbell register 520.

Also shown connected between the primary PCI bus 114 and the secondary PCI bus 115 is an I/O processor bridge bypass circuit (IOP bridge bypass) 530. Preferably this is a conventional PCI-to-PCI bridge device, such as an IBM 82352 PCI-PCI bridge. The bypass bridge 530 provides arbitration for the secondary PCI bus 115 and effectively isolates the secondary PCI bus 115 and its associated interrupts from the primary PCI bus 114.

Figure 12B:
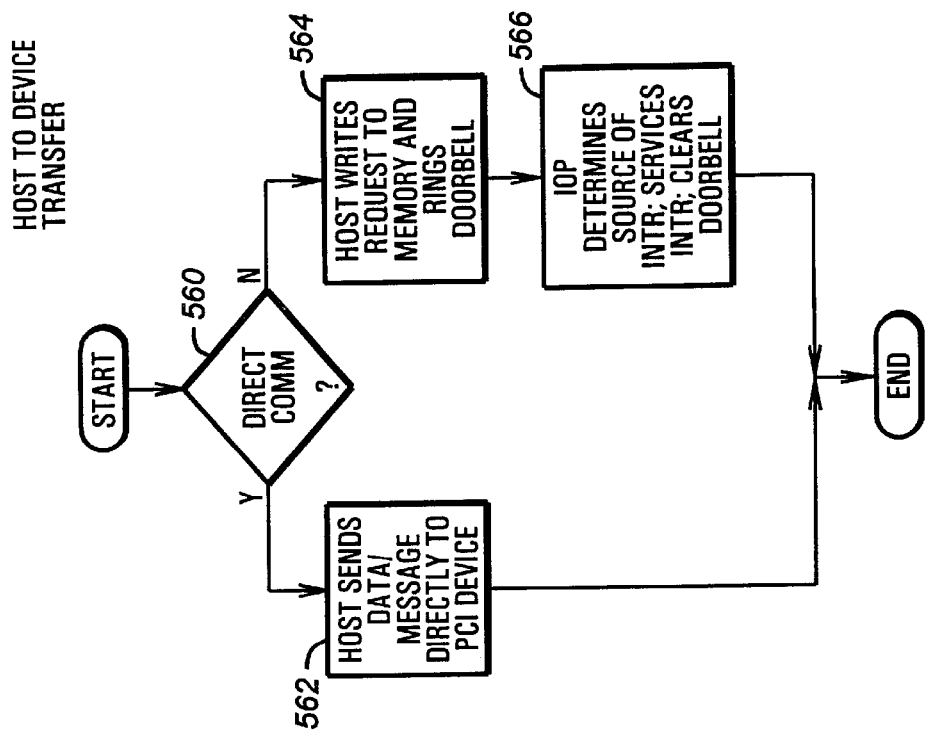
FIGS. 12A and 12B are flow diagrams illustrating a device to host transfer and a host to device transfer.
Figure 12A:
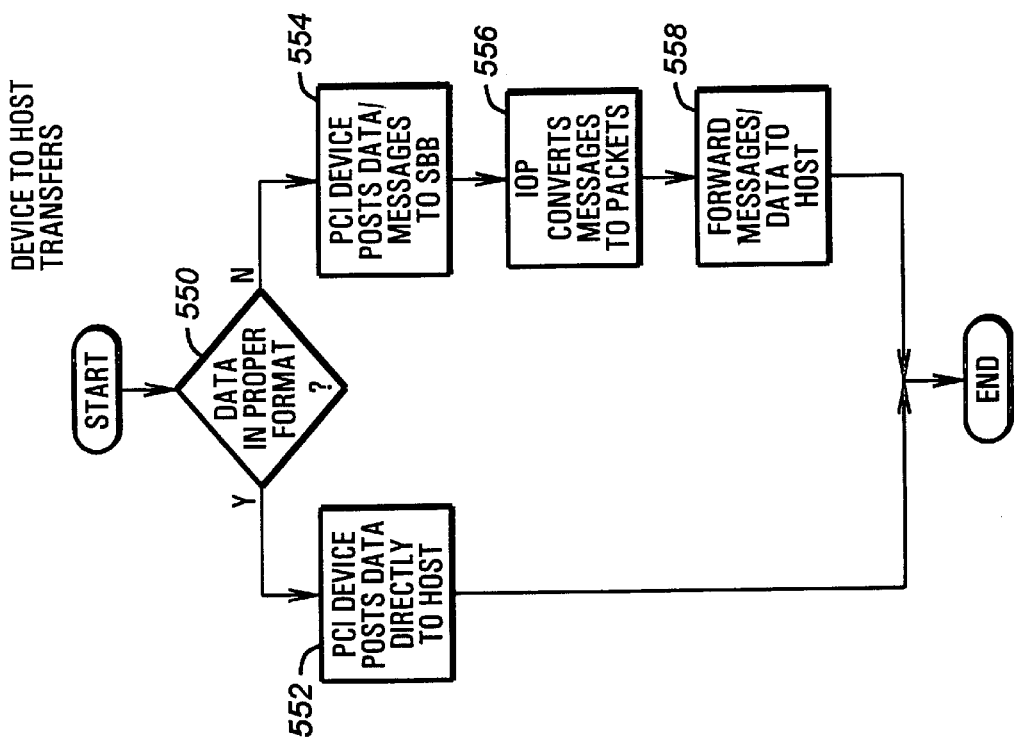

Referring now to FIG. 12A, there is a flow diagram illustrating a PCI device 118 to host 100 transfer. The process typically starts when the PCI device I 18 posts a message/data to the secondary burst buffer 514. Alternatively, if the PCI device 118 is compliant with the DBE protocol, the PCI device 118 can post data directly to memory 112. At step 550, it is determined whether the PCI device 118 can provide data in the proper format. If so, processing continues to step 552 where the PCI device I 18 posts properly formated data/messages directly to memory 112. In this case, the I/O processor 516 becomes an administrator to the PCI device 118 and the bypass bridge 530 is used to move data/messages to the host 100. If not so, processing continues to step 554 where the PCI device 118 posts data/messages to the secondary burst buffer 514. At a step 556, the I/O processor 516 converts the data/message into a DBE compatible protocol and encapsulates the data/message into a packet 250. After the data/message has been formatted, at a step 558 the data/message can be forwarded to the host 100 via a DMA transfer or posted to the primary FIFO 554. By posting the data/message into the primary FIFO 554, the sequential ordering of data is guaranteed.

In a host to PCI device 118 transfer, the process of sending data/messages to a PCI device 118 is similar to the PCI device-to-host transfer (FIG. 12A). At a step 560, it is determined if the host 100 can communicate directly with the PCI device 118. If so, at a step 562 the host 100 sends data/messages directly to the PCI device 118 via the bypass bridge 530. If not so, at a step 564 the host 100 writes requests to memory 112 and rings the corresponding doorbell 520. The doorbell 520 causes an interrupt to the I/O processor 516. When the doorbell 520 is rung, at a step 566 the I/O processor 516 determines the source of the interrupt, services the interrupt and clears the doorbell 520. The I/O processor 516 handles solicited and unsolited packets in a manner similar to the DBE device 206.

Therefore, there is disclosed a packet protocol and alternative hardware engines for moving packets 250 between a host 100 and an I/O device 208.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system having automatic direct memory access, the computer system comprising:

a host bus;

a main memory coupled to said host bus for storing at least one pool of packets, each pool comprised of a linked list of packets, each packet having a header including a physical address field for containing a physical address of a next packet to form the linked list;

a processor coupled to said host bus;

a local bus;

a mass storage subsystem coupled to said local bus;

a host/local bus bridge coupled between said host bus and said local bus, the bus bridge including a distributed burst engine for communicating packets between said mass storage subsystem and said main memory, the distributed burst engine comprising:

a request head register operable to hold the physical address of a next packet of the linked list;

a free queue register operable to hold the physical address of the last packet of the linked list;

a request queue for holding packets, said request queue operable to provide a fullness indication when a packet is therein;

a request doorbell register operable to receive an indication from the processor that a next packet is available to process;

a completion head register operable to hold the physical address of a completion list;

a completion queue for holding packets;

a completion doorbell register operable to receive an indication from the processor that said completion queue has been serviced and that the processor is ready to receive packets;

a first front end controller coupled to the request queue and responsive to said request doorbell register, said first front end controller operable to read a packet from the main memory according to the physical address stored in the request head register when said request doorbell register is rung and store the packet in said request queue;

a first back end controller coupled to the request queue and the completion queue and responsive to the request queue fullness indication, said first back end controller operable to read a packet from said request queue when said request queue is not empty and provide the packet to the mass storage subsystem, said first back end controller further operable to provide the packet to said completion queue when the mass storage subsystem has completed processing the packet; and a completion controller coupled to said completion queue and responsive to the completion doorbell register and the completion head register, said completion controller operable to complete a packet from the completion queue back to the memory.

2. The computer system of claim 1, wherein the distributed burst engine further comprises:

a posted head register operable to hold the physical address of a next packet of the linked list;

a posted queue for holding packets available for use by the mass storage subsystem for unsolicited requests;

a posted doorbell register operable to receive an indication from the processor that a next packet is available in memory for the mass storage subsystem;

a second front end controller coupled to said posted queue and responsive to said posted doorbell register, said second front end controller operable to read posted packets from memory and write the packets into said posted queue; and a second back end controller coupled to the posted queue and the completion queue and responsive to the mass storage subsystem, said second back end controller operable to acquire a packet from said posted queue when said posted queue is not empty and provide said packet to the mass storage subsystem, said second back end controller further operable to provide said packet to said completion queue when the mass storage subsystem has completed processing said packet.

3. The computer system of claim 2, wherein said second back end controller is further operable to acquire packets from memory in response to the processor ringing said posted doorbell register.

4. The computer system of claim 1, wherein the distributed burst engine further comprises:

a completion tail register operable to hold the physical address of a last packet of the completion list, wherein each packet includes a virtual address field for containing a virtual address of a next packet to form the linked list, and wherein if said completion doorbell register is set, said completion controller is further operable to clear said completion doorbell register.

5. The computer system of claim 4, wherein if said completion head register is null said completion controller is operable to write the physical address of the completed packet in said completion tail register and to write the virtual address of the completed packet in said completion head register.

6. The computer system of claim 4, wherein if said completion head register is not null said completion controller is operable to write the virtual address of the completed packet in the physical address field of the packet indicated by the completion tail register and to write the physical address of the completed packet in said completion tail register.

7. The computer system of claim 4, wherein the packets are characterized as being asynchronous, polled and interrupt packets, and wherein if the completed packet is an interrupt packet said completion controller is further operable to cause an interrupt to the processor after clearing said completion doorbell register.

8. The computer system of claim 4, wherein said completion controller is further operable to clear write the physical address of the completed packet into the completion head register.

9. The computer system of claim 1, wherein each packet includes a virtual address field for containing a virtual address of a next packet to form the linked list, and wherein if said completion doorbell register is not set, said completion controller is further operable to write the virtual address of the completed packet in the packet indicated by the completion head register.

10. The computer system of claim 1, wherein each packet includes a virtual address field for containing a virtual address of a next packet to form the linked list, wherein the packets are characterized as being asynchronous, polled and interrupt packets, and wherein if the completed packet is an asynchronous packet the completion controller is further operable to write the virtual address of the completed packet in the packet indicated by the free queue register.

11. The computer system of claim 1, wherein after said first front end controller reads the next packet from memory said first front end controller is operable to replace the physical address stored in the request head register with the physical address contained in the header of the next packet.

12. The computer system of claim 11 wherein said first front end controller is operable to continue reading packets from memory until the physical address contained in the header of the next packet is null.

13. The computer system of claim 1, wherein the packet header includes a bit for indicating direct access, and wherein if a packet having the direct access bit set is received by said back end controller, said back end controller is operable to stop processing packets until a special command is received from the processor.

14. The computer system of claim 1, wherein the mass storage subsystem is capable of reading data directly from memory, and
wherein the payload provided to the mass storage subsystem includes an address range of data in memory for the mass storage subsystem to read.

15. The computer system of claim 1, wherein the mass storage subsystem is capable of reading data, and wherein the payload provided to the mass storage subsystem includes data.

16. The computer system of claim 1, wherein the processor includes a cache having a certain cacheline, and wherein the payload is aligned to a cacheline.

17. The computer system of claim 1, wherein the doorbell registers are memory mapped.

18. The computer system of claim 1, wherein the local bus is a peripheral component interconnect (PCI) bus.

19. The computer system of claim 1, wherein the host/local bus bridge includes a microprocessor.

20. A system for decoupling input/output task from a processor, this system comprising:
a first bus;
a processor coupled to the first bus;
a memory subsystem coupled to the first bus for storing at least one pool of packets, each pool comprised of a linked list of packets;
a second bus;
an input/output device coupled to the second bus; and
a distributed burst engine coupled to the first bus and the second bus, the distributed burst engine communicating distributed burst engine packets with the memory subsystem, and communicating data associated with those packets and a non-distributed burst engine format over the second bus to the input/output device, the distributed burst engine comprising:
a request head register operable to hold the physical address of a next packet of the linked list;
a free queue register operable to hold the physical address of the last packet of the linked list;
a request queue for holding packets, said request queue operable to provide a fullness indication when a packet is therein;
a request doorbell register operable to receive an indication from the processor that a next packet is available to process;
a completion head register operable to hold the physical address of a completion list;
a completion queue for holding packets;
a completion doorbell register operable to receive an indication from the processor that said completion queue has been serviced and that the processor is ready to receive packets;
a first front end controller coupled to the request queue and responsive to said request doorbell register, said first front end controller operable to read a packet from the memory subsystem according to the physical address stored in the request head register when said request doorbell register is rung and store the packet in said request queue;
a first back end controller coupled to the request queue and the completion queue and responsive to the request queue fullness indication, said first back end controller operable to read a packet from said request queue when said request queue is not empty and provide the packet to the input/output device, said first back end controller further operable to provide the packet to said completion queue when the input/output device has completed processing the packet; and
a completion controller coupled to said completion queue and responsive to the completion doorbell register and the completion head register, said completion controller operable to complete a packet from the completion queue back to the memory subsystem,
wherein a packet in a non-distributed burst engine format does not include a packet header containing a physical address of a next packet.

21. The system of claim 20, wherein the input/output device is a disk subsystem.

22. The system of claim 20, wherein the first and second busses are peripheral component interconnect busses.

* * * * *